(12) United States Patent
Landin et al.

(10) Patent No.: US 6,191,510 B1
(45) Date of Patent: Feb. 20, 2001

(54) INTERNALLY DAMPED STATOR, ROTOR, AND TRANSFORMER AND A METHOD OF MAKING

(75) Inventors: Donald T. Landin, Eagan; Gordon G. Johnson, Lake Elmo; Jeffrey W. McCutcheon, Eagan; Larry S. Hilderbrand, Woodbury, all of MN (US)

(73) Assignee: 3M Innovative Properties Company, St. Paul, MN (US)

( * ) Notice: Under 35 U.S.C. 154(b), the term of this patent shall be extended for 0 days.

(21) Appl. No.: 08/994,496

(22) Filed: Dec. 19, 1997

(51) Int. Cl.$^7$ .................................................. H02K 5/24
(52) U.S. Cl. ............................ 310/51; 310/44; 310/45; 310/254; 310/258; 310/259; 310/261
(58) Field of Search ................................ 310/64, 51, 254, 310/261, 45

(56) References Cited

U.S. PATENT DOCUMENTS

| | | | |
|---|---|---|---|
| 4,012,653 | * 3/1977 | Shigeta et al. | 310/217 |
| 4,434,382 | * 2/1984 | Patel et al. | 310/51 |
| 4,563,605 | * 1/1986 | Gerber | 310/74 |
| 4,647,803 | 3/1987 | Von Der Heide et al. | 310/51 |
| 4,938,325 | * 7/1990 | Nakagawa | 188/378 |
| 5,183,863 | 2/1993 | Nakamura et al. | 525/438 |
| 5,241,229 | 8/1993 | Katakura et al. | 310/51 |
| 5,262,232 | 11/1993 | Wilfong et al. | 428/327 |
| 5,283,491 | 2/1994 | Jabbar et al. | 310/90 |
| 5,308,887 | 5/1994 | Ko et al. | 522/148 |
| 5,365,388 | 11/1994 | Maughan et al. | 360/99.04 |
| 5,429,477 | 7/1995 | Sikorski et al. | |
| 5,430,589 | 7/1995 | Moir et al. | |
| 5,576,584 | * 11/1996 | Kusumoto et al. | 310/45 |
| 5,619,389 | 4/1997 | Dunfield et al. | 360/98.07 |

FOREIGN PATENT DOCUMENTS

| | | | |
|---|---|---|---|
| 2 267 326 | 1/1993 | (GB) | F16F/9/12 |
| 57-003560 | 1/1982 | (JP) | H02K/15/12 |
| 57-055744 | 4/1982 | (JP) | H02K/1/04 |
| 58-207852 | 12/1983 | (JP) | H02K/29/00 |
| 60-139157 | 7/1985 | (JP) | H02K/29/00 |
| 1-190251 | 7/1989 | (JP) | H02K/41/025 |

OTHER PUBLICATIONS

"Some Aspects of Spindle Motors for Computer Disk Drives," *Journal of the Institution of Engineers*, vol. 32, No. 1, Singapore, Feb. 1992.

Dariusz R. Karkosinski, "Determination of Production Reasons of Vibration and Noise Level Scattering of Mass–Produced Induction Motors," Electric Machines and Power Systems, vol. 23, pp. 319–328 (1995).

C. Rajalingham, et al., "Influence of Support Flexibility and Damping Characteristics on the Stability of Rotors with Stiffness Anisotropy About Shaft Principal Axes," Int J Mech Sci, vol. 14, No. 9, pp. 717–726 (1992).

\* cited by examiner

*Primary Examiner*—Elvin Enad

(57) ABSTRACT

The present invention provides internally damped stators, rotors, and transformers; internally damped cores from which they may be made; and a method of making the aforementioned.

19 Claims, 10 Drawing Sheets

INTERNALLY DAMPED STATOR, ROTOR, AND TRANSFORMER AND A METHOD OF MAKING

FIELD OF THE INVENTION

The present invention provides internally damped stators, rotors, and transformers having improved vibration damping performance and the internally damped cores from which they are made.

The internally damped stators are useful, for example, for various electric or magnetic motor applications, specifically electric motors used for disk drive spindle motors and electric motors used for automobiles and power generating equipment. The internally damped stator improves the vibration damping properties of the motor with which it may be used.

The internally damped rotors are useful, for example, for various electric or magnetic motor applications, specifically electric motors used for disk drive spindle motors and electric motors used for automobiles and power generating equipment. The internally damped rotor improves the vibration damping properties of the motor with which it may be used.

The internally damped transformers are useful, for example, for various electric or magnetic applications, specifically power supplies in computers and stereo equipment. The internally damped transformer core improves the vibration damping properties of the transformer in which it may be used.

Methods of making the internally damped cores, stators, rotors, and transformers of the invention are also provided. The preferred method is cost effective and particularly good for manufacturing at high volumes. The internally damped stators, rotors, and transformers can optionally be made in such a manner as to reduce cut and shorted wires.

BACKGROUND OF THE INVENTION

Periodic or random vibrations or shocks can excite the induction core of a stator, rotor, or transformer to vibrate at its resonant frequencies. These can be problematic due to the resultant formation of undesirable stresses, displacements, fatigue, and sound radiation. Such undesirable vibrations or shocks are typically induced by the interaction of the stator and rotor. The resulting magnetic flux interactions of the stator and rotor can lead to vibration in either of the components.

Flux build-up and flux fields interacting with each other at high rates can lead to a flux field force being applied to the stator or rotor, causing it to vibrate at resonant frequencies resulting in sound radiation, fatigue, and vibrations that can be transmitted to other portions of the motor or items attached to the motor leading to degraded performance (such as in a disk drive where the excessive vibrations transmitted by the stator can cause read and write errors and reduced drive performance) and/or excessive heat build-up from frictional movement. A quiet motor is important to many applications. For example, disk drives often require a motor to operate at less than 30–45 dBA so that when the drive is used in an application, it does not bother the end user of the drive.

Typical stators, rotors, and transformers have many magnetic layers. These layers are stamped or otherwise cut in single individual layers, typically a ring pattern with "poles" extending from the ring. The magnetic layers are stacked by hand or by automated assembly to the desired stack height of the stator, rotor, or transformer. The layers are then joined in a number of ways, such as, for example, by pressing the layers together with a die and using a punch to crimp the layers together, coining, embossing, encasing or coating the outer surfaces of the assembled layers with a rigid non-vibration damping polymeric material (such as an epoxy), applying heat and pressure to form a hydrostatic bond, or combinations of the aforementioned.

Various techniques have been used to reduce vibrational and shock effects (stresses, displacements, etc.) on stators. Three basic techniques include:

1) adding stiffness or mass to the stator so that the resonant modes of the stator are not excited in operation;
2) isolating the stator so that the vibrational or shock energy does not excite other items in the motor construction or items connected to the motor; and
3) damping the stator core by "potting" or encasing the stator core exterior, or portions of the stator core exterior in a polymeric potting material. Typically a polymeric potting material, which optionally may have some damping benefit and/or stiffness benefit, may be used to encase all or a portion of the stator core exterior, thereby reducing the vibration excitation levels and the harmful effects.

Katakura et al., U.S. Pat. No. 5,241,229 discloses a magnetic disc drive motor comprising a hub for carrying magnetic discs on its outer periphery, a drive magnet rigidly fitted to the inner periphery of the hub, a stator core having a coil wound around it and juxtaposed with the drive magnet, and a motor frame having a substantially cylindrical holder for rigidly holding the stator core, wherein the space between the stator core and the motor frame is filled with a resin material. A compact and simply configured magnetic disc drive motor can thus be realized, which is capable of rotating magnetic discs in a very stabilized manner. With such an arrangement, since the space between the stator core and the motor frame, which was not used for any particular purpose, is filled with a resin material, the space within the motor is effectively utilized to enhance the rigidity of the motor frame.

The aforementioned design provides for a stiffer stator thereby reducing some vibration levels. In addition, the resin material can also provide some vibration damping. This design, however, is difficult to manufacture as filling between the poles is difficult. The design can also reduce the heat flow away from the stator increasing the temperature of the windings and creating various problems related to high temperatures of the motor.

This design would also be expensive to manufacture as each stator with windings in place would need to be potted, requiring fixturing, cure ovens, and potential long manufacturing cycles. Variability between stators being potted would be expected as each would have variations due to tolerances of the windings, etc. The potted design would also require a significant amount of organic resin material to be used inside the motor and disk drive assembly. The organic resin material would be largely exposed to the internal motor and drive atmosphere which could lead to outgassing concerns when the drive operates at elevated temperatures (typically greater than 45° C., most typically greater than 60° C.). The outgassing could lead to corrosion or outgassed material build-up on various parts inside the motor or drive, such as on a disk, read/write heads and other exposed surfaces leading to drive performance reductions or drive failure.

Von Der Heide, et al., U.S. Pat. No. 4,647,803 discloses an electric motor with a substantially cylindrical air gap between the stator and the rotor, the stator being fitted to a bearing support for the rotor shaft bearing. In order to reduce noise emissions, the stator is connected to the bearing support by means of an elastic damper and the stator and bearing support are separated from one another by an air gap adjacent at least part of their facing faces. This design adds damping and isolation, but would be costly to manufacture and also requires additional manufacturing steps to make the motor and precise alignments of parts.

Maughan et al., U.S. Pat. No. 5,365,388 discloses a disk drive that has a stator positioner disposed on a shoulder of a drive shaft housing which is part of a spicule. The positioner secures the stator against movement and references the motor to the spicule which engages and guides the cartridge. An open cell urethane gasket between the printed circuit board and the stator absorbs vibrational forces. This design offers isolation, but does not offer direct damping of the stator, thus its overall effectiveness is limited.

Dunfield et at., U.S. Pat. No. 5,619,389 discloses a spindle motor for rotating at least one disc in a data storage device which includes a base, a shaft, a rotor and a stator. According to the patent a bearing interconnects the rotor with the shaft and allows the rotor to rotate about the shaft. A resilient coupling, such has an O-ring, is compressed between the stator and the base to mechanically isolate the stator from the base and thereby reduce the generation of acoustic noise in the storage device.

The paper appearing in the Journal of the Institution of Engineers, Singapore. Vol. 32 No. 1 February 1992 entitled "Some Aspects of Spindle Motors for Computer Disk Drives" provides an overview of disk drive motor design.

U.S. Pat. No. 5,283,491 entitled, "Air Bearing Motor Assembly for Magnetic Recording Systems" discloses an air bearing motor design. The patent demonstrates that even newer state of the art motors can benefit from an improved method of damping the stator and that prior art methods of damping the stator or isolating the stator have significant performance and manufacturing issues that need to be resolved.

All of the above techniques have drawbacks such as high manufacturing costs, excessive heat retention, significant added mass, difficult assembly procedures for winding wire around the stator core, significant new equipment investment, and high dimensional tolerance design. The aforementioned designs also may not be useful for very high volume motors for disk drives where volumes can be on the order of 1–10 million units a month.

SUMMARY OF THE INVENTION

The present invention provides in one embodiment an internally damped core, wherein the core is selected from the group consisting of stator, rotor, and transformer cores.

The present invention provides in another embodiment an internally damped core having at least one inner layer of vibration damping material comprising a viscoelastic material contained therein, wherein the core is selected from the group consisting of stator, rotor and transformer cores.

The present invention provides in another embodiment an internally damped core, wherein the internally damped core comprises a laminate comprising:

(a) two outer magnetic layers;
(b) an inner layer of vibration damping material comprising a viscoelastic material positioned between the two outer magnetic layers; wherein the core is selected from the group consisting of stator, rotor and transformer cores.

The present invention provides in another embodiment an internally damped core, wherein the internally damped core comprises a laminate comprising:

(a) two outer magnetic layers;
(b) at least two inner vibration damping material layers comprising a viscoelastic material positioned between the two outer magnetic layers;
(c) at least one magnetic layer positioned interior to the outer magnetic layers;

wherein the core is selected from the group consisting of stator, rotor, and transformer cores.

The present invention provides in another embodiment the internally damped core wherein each vibration damping material layer is positioned between two magnetic layers.

The present invention provides in another embodiment the core wherein each magnetic layer comprises a ring having poles extending therefrom.

The present invention provides in another embodiment the core wherein each ring has at least 4 poles extending therefrom.

The present invention provides in another embodiment the core wherein each ring has at least 8 poles extending therefrom.

The present invention provides in another embodiment an internally damped stator comprising the core, wherein the core is a stator core, and wire wrapped around the poles of the core.

The present invention provides in another embodiment an internally damped rotor comprising the core, wherein the core is a rotor core, and wire wrapped around the core.

The present invention provides in another embodiment an internally damped transformer comprising the core, wherein the core is a transformer core, and wire wrapped around the core.

The present invention provides in another embodiment the core wherein the vibration damping material further comprises a thermally conductive additive.

The present invention provides in another embodiment the core wherein the vibration damping material further comprises a magnetic additive.

The present invention provides in another embodiment the core wherein the magnetic layers are non-oriented.

The present invention provides in another embodiment the core wherein the core has edges and wherein the edges are rounded.

The present invention provides in another embodiment the core wherein the core comprises at last 8 magnetic layers and at least 7 vibration damping material layers.

The present invention provides in another embodiment the core which comprises at least 20 magnetic layers and at least 19 vibration damping material layers.

The present invention provides in another embodiment an alternator having the stator installed therein.

The present invention provides in another embodiment a motor having the stator installed therein.

The present invention provides in another embodiment a motor having the rotor installed therein.

The present invention provides in another embodiment a method of making an internally damped core comprising the steps of:

(a) providing a first laminate section and a second laminate section, wherein the first laminate section is formed by a method comprising the steps of
 (i) preparing a first laminate comprising a magnetic layer and a layer of vibration damping material bonded thereto; and (ii) cutting the first laminate section from the first laminate, the first laminate section having a shape; and wherein the second laminate section is formed by a method comprising the steps of
(i) preparing a second laminate comprising
(A) a first outer magnetic layer;
(B) a second outer magnetic layer; and
(C) a layer of vibration damping material positioned between the outer magnetic layers;
(ii) cutting the second laminate section from the second laminate, wherein the second laminate section has shape which is substantially the same (typically the same) as the shape of the first laminate section, wherein the second magnetic layer of the second laminate section has a burr thereon caused by the cutting;

(b) joining the first laminate section and the second laminate section to form a core in such a manner that the burr is not on the outside of the core;

wherein the core is selected from the group consisting of stator cores, rotor cores and transformer cores.

The present invention provides in another embodiment a method of making an internally damped core comprising the steps of (a) providing at least two laminate sections, wherein each laminate section is independently selected from the group consisting of first laminate sections and second laminate sections; and wherein each first laminate section is independently formed by a method comprising the steps of
(i) preparing a first laminate comprising a magnetic layer and a layer of vibration damping material bonded thereto; and
(ii) cutting a first laminate section from the first laminate, the first laminate section having a shape; and wherein each second laminate section is independently formed by a method comprising the steps of
(i) preparing a second laminate comprising
(A) a first outer magnetic layer;
(B) a second outer magnetic layer; and
(C) a layer of vibration damping material positioned between the two outer magnetic layers;
(ii) cutting the second laminate section from the second laminate, wherein the second laminate section has a shape which is substantially the same (typically the same) as the shape of the first laminate section, and wherein the second magnetic layer of the second laminate section has a burr thereon caused by the cutting;

(b) joining the laminate sections together to form a core in such a manner that no exposed burr is present on the core;

wherein the core is selected from the group consisting of stator cores, rotor cores and transformer cores.

The present invention provides in another embodiment a method wherein the laminate sections are joined via vibration damping material.

The present invention provides in another embodiment a method wherein the core has edges and wherein the edges are rounded.

The present invention provides in another embodiment a method which further comprises the step of winding wire around the core.

The present invention provides in another embodiment a method wherein the laminate sections are joined via vibration damping material.

The present invention provides in another embodiment the internally damped core made according to a method of the invention.

DETAILED DESCRIPTION OF THE INVENTION

Figure 1:
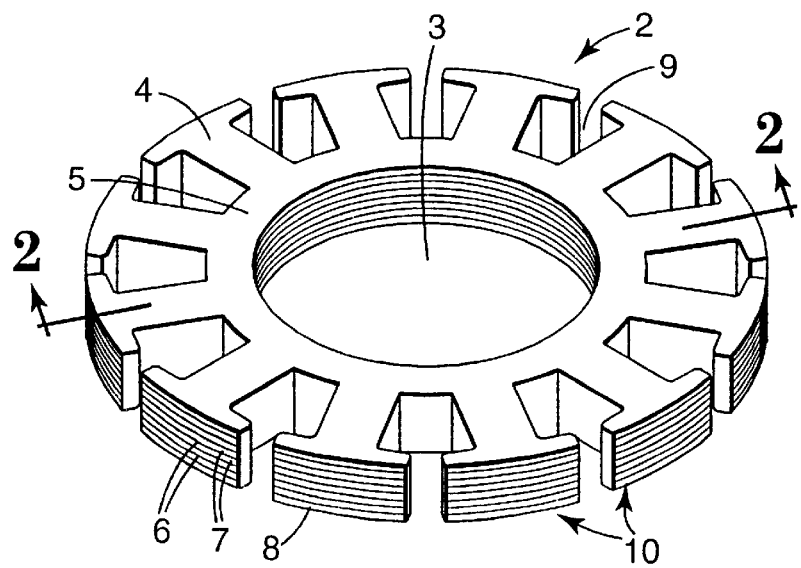
FIG. 1 illustrates a perspective view of an internally damped stator core of the present invention.

The present invention provides a stator, rotor, and a transformer each having improved damping properties which can overcome problems in a variety of applications where stators, rotors, and transformers are exposed to vibration or shock. More specifically, the present invention provides a vibration and shock resistant internally damped stator, rotor, and transformer, that preferably uses a highly dissipative damping material with a loss factor of at least about 0.01 (more preferably at least about 0.1) at least somewhere in the temperature range of about −40 to about 150° C. and at least somewhere in the frequency range of about 1 to about 10,000 Hz. Preferably the vibration damping material has the aforementioned loss factor at the typical operating temperature range and frequency range for a given motor design and for the frequencies that have the greatest impact on motor performance. Typically the vibration damping material should have a loss factor of at least about 0.01 at least somewhere in the temperature range of about −40 to about 150° C. and at least somewhere in the frequency range of about 1 to about 10,000 Hz, preferably at least about 0.1 at a temperature of about −40 to about 150° C. and a frequency of about 1 to about 10,000 Hz. This damping material, when placed in the stator, rotor, or transformer article as inner layer(s), can be exposed to significant amounts of strain energy in various vibrational modes of interest and dissipate a portion of this vibrational energy as heat, thereby diminishing vibration and shock displacement oscillations. The present invention functions so as to damp, i.e., reduce the vibrational or shock amplitude or duration of, a wide variety of vibrational modes, e.g., bending, torsion, sway, rocking, gyroscopic, and extensional modes, in a wide variety of stator, rotor, and transformer designs and over a wide frequency and temperature range.

The present invention typically involves the incorporation of a vibration damping material as one or more interior layers of the stator core, rotor core, or transformer core and the stator, rotor, or transformer formed therefrom. The vibration damping material may be layered in between the magnetic layers, e.g., iron, iron alloys, etc. of the core. Preferably, the laminated material has the damping material laminated, sprayed, silk screened, coated, or cast onto one or more magnetic layers. The damping material layer can be continuous, or discontinuous.

A damping layer(s) may substantially form a layer having about the same dimensions (length and width but not typically thickness) as the magnetic layers between which it is sandwiched. Alternately, a damping layer(s) may be of more limited dimensions and may be situated in area(s) of greatest vibrational strain.

Typically, an amount of the damping material is present such that the damping characteristics of the stator, rotor, or transformer are improved. Preferably, a sufficient amount of the vibration damping material is used such that the damping is improved by at least about 10% in at least one vibrational mode. As a result of this technique, high mechanical strains are introduced into the damping material when the structure is excited at one or more of its natural frequencies. A portion of the resulting mechanical strain energy in the damping material is then dissipated in the form of heat. The higher the strain energy in the damping material, the more vibrational energy is dissipated from the stator, rotor, or transformer.

The vibration damping material layer(s) are placed in the article where one or more vibrational modes are active. By such placement, the amount of strain energy that is generated in the damping material used for the stator, rotor, or transformer can be maximized. The identification of these locations can be determined by using modal analysis or finite element analysis. The vibration damping material provides many benefits, including reduced acoustic levels, either on an overall dBA reduction or for specific vibration tones or frequencies.

Core

The induction core comprises a laminate comprising magnetic layers and vibration damping material layer(s).

The stator core or rotor core as well as each layer making up the stator core or rotor core typically has the following shape. The shape is that of a ring having poles (which also may be referred to as arms or protrusions) joined to the ring and extending away from the center of the ring, toward the center of the ring, or both, depending on the design. The poles are separated by openings, slots, or cut-outs. For example, the poles may be attached to the inside of the ring such that they extend into the area including the hole. Alternatively the poles may extend from the outer perimeter of the ring in a direction away form the hole. The ring and the poles are typically in the same plane. Each pole has two ends, the end attached to the ring and a free end. The free end is typically wider than the rest of the pole. The free ends are frequently T-shaped. The free end typically has a shape which serves to prevent the wire wrapped around the stator or rotor pole from slipping off. The free end also contributes to the management of the flux of the stator or rotor when energized and also between the stator and the rotor portion of the motor design where the permanent magnets may be disposed.

The transformer core as well as each layer making up the transformer core typically have one of the following shapes: that of a solid geometric shape such as a rectangle or square, or a rectangle or square with a cut-out (such as a smaller geometric area such as a rectangle or square) within the larger geometric shape. With respect to the latter shape it would typically be that of a square or rectangular ring, for example.

Vibration Damping Material

The vibration damping material can include any material that is viscoelastic. A viscoelastic material is one that is viscous, and therefore capable of dissipating energy, yet exhibits certain elastic properties, and therefore capable of storing energy. That is, a viscoelastic material is an elastomeric material typically containing long-chain molecules that can convert mechanical energy into heat when they are deformed. Such a material typically can be deformed, e.g., stretched, by an applied load and gradually regain its original shape, e.g., contract, sometime after the load has been removed.

Suitable viscoelastic materials for use in the vibration damping materials of the present invention have a storage modulus, i.e., measure of the energy stored during deformation, of at least about 1.0 psi ($6.9 \times 10^3$ Pascals). The storage modulus of useful viscoelastic materials can be as high as 500,000 psi ($3.45 \times 10^9$ Pascals); however, typically it is about 10–2000 psi ($6.9 \times 10^4$–$1.4 \times 10^7$ Pascals).

Suitable viscoelastic materials for use in the vibration damping materials of the present invention have a loss factor, i.e., the ratio of energy loss to energy stored, of at least about 0.01. Preferably the loss factor is at least about 0.1, more preferably about 0.5–10, and most preferably about 1–10, in the frequency and temperature range where damping is required (typically about 1–10,000 Hz and −40 to 150° C. This loss factor is a measure of the material's ability to dissipate energy and depends on the frequency and temperature experienced by the damping material. For example, for a particular crosslinked acrylic polymer, at a frequency of 100 Hz, the loss factor at 158° F. (70° C.) is about 0.7.

Preferred viscoelastic materials are those that remain functional over a wide range of temperatures, e.g., −40° F. (−40° C.) to 482° F. (250° C.). Most preferred viscoelastic materials are those that do not experience a significant degradation in properties due to long times at high temperatures or short excursions beyond these high temperature levels.

Useful viscoelastic damping materials can be isotropic as well as anisotropic materials, particularly with respect to its elastic properties. As used herein, an "anisotropic material" or "nonisotropic material" is one in which the properties are dependent upon the direction of measurement. Suitable viscoelastic materials include urethane rubbers, fluorine based elastomers, fluorine based rubbers, silicone rubbers, nitrile rubbers, butyl rubbers, acrylic rubbers, natural rubbers, styrene-butadiene rubbers, and the like. Other useful damping viscoelastic materials include polyesters, polyurethanes, polyamides, ethylene-vinyl acetate copolymers, polyvinyl butyral, polyvinyl butyral-polyvinyl acetate copolymers, epoxy-acrylate interpenetrating networks and the like. Specific examples of useful materials are disclosed or referenced in U.S. Pat. No. 5,183,863 (issued Feb. 2, 1993), U.S. Pat. No. 5,262,232 (issued Nov. 16, 1993) and U.S. Pat. No. 5,308,887 (issued May 3, 1994), all of which are incorporated herein by reference.

Examples of thermoplastic materials suitable for use as the vibration damping material in the cores and stators, rotors, and transformers made therefrom according to the present invention include, but are not limited to, those selected from the group consisting of polyacrylates, polycarbonates, polyetherimides, polyesters, polysulfones, polystyrenes, acrylonitrile-butadiene-styrene block copolymers, polypropylenes, acetal polymers, polyamides, polyvinyl chlorides, polyethylenes, polyurethanes, and combinations thereof.

Useful viscoelastic materials can also be crosslinkable to enhance their strength. Such viscoelastics are classified as thermosetting resins. When the viscoelastic material is a thermosetting resin, then prior to the manufacture of the stator the thermosetting resin is in a thermoplastic state. During the manufacturing process, the thermosetting resin is cured and/or crosslinked typically to a solid state, although it could be a gel upon curing as long as the cured material possesses the viscoelastic properties described above. Depending upon the particular thermosetting resin employed, the thermosetting resin can include a curing agent, e.g., catalyst, which when exposed to an appropriate energy source (such as thermal energy) the curing agent initiates the polymerization of the thermosetting resin. Particularly preferred viscoelastic damping materials are those based on acrylates.

In general, any suitable viscoelastic material can be used. The choice of viscoelastic material for a particular set of conditions, e.g., temperature and frequency of vibration, etc., is within the knowledge of one of skill in the art of viscoelastic damping. It is to be understood that blends of any of the foregoing materials can also be used.

In addition to the viscoelastic material, the vibration damping material of certain preferred embodiments of the present invention includes an effective amount of a fibrous and/or particulate material. Herein, an "effective amount" of a fibrous material and/or particulate is an amount sufficient to increase the strain energy ratio of a component containing the same amount and type of viscoelastic material without the fibrous or particulate material. Generally, an increase in the strain energy ratio of a factor of at least about two in at least one vibrational mode is desired. Typically, the amount of the fibrous material in the viscoelastic material is within a range of about 3–60 wt %, preferably about 10–50 wt %, more preferably about 15–45 wt %, and most preferably about 20–40 wt %, based on the total weight of the vibration damping material. Typically, the amount of the particulate material in the viscoelastic material is within a range of about 0.5–70 wt %, preferably about 1–45 wt %, more preferably about 5–40 wt %, and most preferably about 5–30 wt %, based on the total weight of the vibration damping material containing the additive (a particular layer, for example). The fibrous material can be in the form of fibrous strands or in the form of a fiber mat or web, although fibrous strands are preferred. The fibrous strands can be in the form of threads, cords, yarns, filaments, etc., as long as the viscoelastic material can wet the surface of the material. They can be dispersed randomly or uniformly in a specified order. Preferably, the fibrous strands, i.e., fibers or fine threadlike pieces, have an aspect ratio of at least about 2:1, and more preferably an aspect ratio within a range of about 2:1 to about 10:1. The aspect ratio of a fiber is the ratio of the longer dimension of the fiber to the shorter dimension.

The fibrous material can be composed of any material that increases the damping capability of the viscoelastic material. Examples of useful fibrous materials in applications of the present invention include metallic fibrous materials, such as aluminum oxide, magnesium, iron alloys, or steel fibers, as well as nonmetallic fibrous materials, such as glass or fiberglass. Generally, high Young's modulus fibrous materials, i.e., those having a modulus of at least about 1,000,000 psi ($6.9\times10^9$ Pascals), are preferred. Most preferably, the fibrous material is nonmetallic. The nonmetallic fibrous materials can be a variety of materials, including, but not limited to, those selected from the group consisting of glass, carbon, minerals, synthetic or natural heat resistant organic materials, and ceramic materials. Preferred fibrous materials for stators, rotors, and transformers of the present invention are organic materials, glass, and ceramic fibrous material.

By "heat resistant" organic fibrous material, it is meant that useable organic materials should be sufficiently resistant to melting, or otherwise softening or breaking down under the conditions of manufacture and use of the stator, rotor, or transformer of the present invention. Useful natural organic fibrous materials include, but are not limited to, those selected from the group consisting of wool, silk, cotton, and cellulose. Examples of useful synthetic organic fibrous materials include, but are not limited to, those selected from the group consisting of polyvinyl alcohol, nylon, polyester, rayon, polyamide, acrylic, polyolefin, aramid, and phenol. The preferred organic fibrous material for applications of the present invention is aramid fibrous material. Such a material is commercially available from Dupont Co., Wilmington, Del. under the tradenames of "Kevlar" and "Nomex."

Generally, any ceramic fibrous material is useful in applications of the present invention. An example of a ceramic fibrous material suitable for the present invention is NEXTELÔ which is commercially available from Minnesota Mining and Manufacturing Co., St. Paul, Minn. Examples of useful, commercially available, glass fibrous material are those available from PPG Industries, Inc. Pittsburgh, Pa., under the product name E-glass bobbin yarn; Owens Corning, Toledo, Ohio, under the product name "Fiberglass" continuous filament yarn; and Manville Corporation, Toledo, Ohio, under the product name "Star Rov 502" fiberglass roving.

Advantages can be obtained through use of fibrous materials of a length as short as about 100 micrometers. The fibers are not limited in length but much longer fibers may provide insufficient fiber interface and therefore decreased shearing surfaces between fibers. The fiber thickness or diameter for typical fibrous material ranges from about at least 5 micrometers. The thinner the fiber, the higher the surface area of the fibrous material. Thus, preferred fibrous materials are very thin. The thickness of the fiber is also dependent upon the desired thickness of the overall damping material layer that will be used in the core. Thus, many common fibers may not be suitable if the overall damping material thickness is relatively thin (e.g., 4–10 micrometers).

The particulate material useful in the invention can be in the form of glass and ceramic bubbles or beads, flakes, or powder, as long as the viscoelastic can wet the surface of the material. The particulate material can vary in size, but preferably should not be greater than the thickness of the damping material layer. Preferably, the particulate material is on the size order of about 0.1 to about 5 micrometers and more preferably about 0.1 to about 2 micrometers.

The particulate material can be composed of any material that increases the damping capability of the viscoelastic damping material.

Useful particulates may be metallic or non-metallic. Examples of useful particulate materials in applications of the present invention include coated or uncoated glass and ceramic bubbles or beads such as thermally conductive bubbles, powders such as aluminum oxide powder and aluminum nitride powder, iron oxide, silica, cured epoxy nodules, magnetic steel powders, magnetic powders, and the like, i.e., those having a modulus of at least about 10,000 psi ($6.9 \times 10^7$ Pascals), are preferred. More preferably, useful particulate materials have a Young's modulus of about 100,000 psi ($6.9 \times 10^8$ Pascals), and most preferable are those with a modulus of at least 1,000,000 psi ($6.9 \times 10^9$ Pascals). Blends of a particulate material and fibrous material can be used from about 0.5 wt % to about 70 wt % based on the weight % of damping material.

Certain additives noted above may be selected specifically for their high thermal conductivity capacity to provide for improved heat flow between stator, rotor, or transformer layers. This improved heat flow can provide improved heat loss to the surrounding environment (motor parts, air, etc.) or heat flow through the stator, rotor, or transformer. Additives having high thermal conductivity include aluminum oxide, aluminum nitride, titanium dioxide, boron nitride, silicon nitride, etc.

The use of magnetic material additives in the vibration damping material such as ferromagnetic materials, rare earth metals, rare earth alloys, etc. may provide for improved magnetic performance of the stator, rotor, or transformer. These additives can provide for improved or modified flux paths, improved or modified flux concentration, improved or modified flux density, and/or improved or increased flux generation compared to an identical stator, rotor, or transformer without such additives. An improvement in flux path efficiency can lead to improved motor performance.

These additives may also enable a vibration damping material layer to take on the characteristics of a magnetic layer in regards to being an improved flux path as compared to a damping material layer with no flux path enhancing additives.

The vibration damping material layer is usefully modified by flux additives if the flux density is improved by at least about 5 times over the same vibration damping material with no flux additive enhancers. Preferably the flux density of the magnetic material additive containing vibration damping material is increased by at least about 20 times, more preferably at least about 100 times and most preferably at least about 500 times compared to vibration damping material free of such additives. The change in flux density of the damping material is related to the magnetic properties of the additive. The greater the magnetic properties, the greater the flux density for a given electrical current applied to the windings of the stator, rotor, or transformer.

The vibrational damping material can include a viscoelastic material or a combination of viscoelastic material with a fibrous or particulate material. It is to be understood that the vibration damping material can thus include a blend of viscoelastic materials as well as a variety of different fibrous or particulate materials. Blends of fibrous and particulate material are also possible.

In addition to fibers and particulate material, the vibration damping material of the present invention can include additives such as fillers (e.g., talc, etc.), colorants, toughening agents, fire retardants, antioxidants, antistatic agents, and the like. Sufficient amounts of each of these materials can be used to effect the desired result.

The damped stator, rotor, or transformer of the invention utilizes the damping of viscoelastic materials with a minimum impact on the stator, rotor, or transformer structural geometry and stiffness.

The desired thickness of the vibration damping material typically ranges from about 0.0002 to about 0.050 inch (about 0.005 to about 1.3 mm), preferably about 0.0005 to about 0.010 inch (about 0.013 to about 0.25 mm), and most preferably about 0.0005 to about 0.005 inch (about 0.013 to about 0.13 mm). Typically, the total thickness of all the vibration damping material layers is about 0.5 to about 50% of the thickness of the stator, rotor, or transformer core, more typically about 1 to about 25%. Typically the average thickness of the vibration damping material layers in a core is about 0.2 to about 25 percent of the average thickness of the magnetic layers in the core, preferably about 0.5 to about 7 percent, most preferably about 0.5 to about 5 percent.

The stator, rotor or transformer article of the invention typically contains at least 1 vibration damping material layer. For example the article may comprise at least 2, 3, 4, 5, 6, 7, 8, 9, 10 or more vibration damping material layers. Typically the core (and the stator, rotor, or transformer made therefrom) comprises 2 to 400 vibration damping material layers, more typically 4 to 100 layers, and most typically 7 to 50 layers for reasons of best damping properties and also manufacturing considerations. The number of layers of the stator, rotor, or transformer is determined by the overall design, desired damping performance, dimensional height limitations, performance specifications, etc. Once the needs are known for a given end use application, the stator, rotor, or transformer can be designed with the desired number of layers to achieve the desired performance levels (output, weight, cost, speed, etc.) and vibration damping performance, etc.

A wider temperature range of damping is possible when multiple layers of different damping materials are included. The amount of damping material used can vary. Sufficient material should be used to obtain the desired damping effect while balancing the structural requirements of the stator, rotor, or transformer.

The vibration damping layer may be continuous or discontinuous. A continuous layer may comprise the same material or adjacent sections of different vibration damping materials, for example. As an example, the vibration damping materials may be chemically different. A discontinuous layer may comprise sections of damping material separated by non-damping material and/or spaces, for example. When two or more vibration damping material layers are present the layers may comprise the same or different damping material and each may be continuous or discontinuous.

Magnetic Layers

A variety of magnetic layers can be used in the stators, rotors, and transformers of the present invention and the cores from which they are made. The magnetic layer may be formed from a magnetic material including but not limited to those selected from the group consisting of ferromagnetic materials such as iron, iron alloys, magnetic stainless steels, carbon steel, alloys such as cobalt-boron-iron, iron-nickelcobalt, etc.; rare earth metals; alloys of rare earth metals; etc. Any material that allows conduction of magnetic flux could be used, but materials with highly magnetic properties are most useful (i.e. high permeability). Magnetic materials which are non-oriented are preferred. A specific example of a useful magnetic material, is a non-oriented electrical steel from Nippon Steel Corp. designated as NSC 35H270. Another example of a useful magnetic material is a non-oriented electrical steel designated as American Society for Testing and Materials (ASTM) 36F158.

The magnetic layers typically have a storage modulus greater than that of the vibration damping layer(s) which also makes up the core. The magnetic layers more typically have a storage modulus at least about 10 times greater than the storage modulus of the vibration damping material layer(s), preferably at least about 100 times greater, more preferably at least about 1000 times greater, and most preferably about 10,000 times greater.

The number of magnetic layers in a stator, rotor or transformer or core from which they are made can vary. At least two magnetic layers should be present. For example the stator, rotor, or transformer or core from which they are made may comprise at least 2, 3, 4, 5, 6, 7, 8, 9, 10, etc. or more magnetic layers. Typically 2 to 400 magnetic layers are present in the stator, rotor, or transformer or core from which they are made, more typically 4 to 100, and most typically 8 to 50. The thickness of the magnetic layers can vary. Typically each magnetic layer has a thickness of about 0.0005 inch to about 0.25 inch (about 0.0127 to about 6.35 mm), preferably about 0.001 to about 0.1 inch (about 0.0254 to about 2.54 mm), and most preferably about 0.005 to about 0.06 inch ( about 0.127 to about 1.524 mm).

Each magnetic layer of the stator or rotor typically has a hole therein (typically a central hole.) As discussed previously each magnetic layer of the stator or rotor typically has a ring shape with poles extending in an outward direction away from the ring. These poles provide areas for wires to be wrapped around the stator or rotor core. A transformer does not typically have poles but rather is typically solid or solid but for a cut-out or hole in its interior section. Wires which are wrapped around a stator, rotor or transformer core are also referred to as windings herein.

The length, width, and thickness of the magnetic layers can vary. Each rotor, stator, and transformer typically has the magnetic layers and the vibration damping material layer(s) of the same shape, length and width (but not typically the same thickness). The vibration damping material layer could, for example, be of an "undercut" design so that any exposed vibration damping material is minimized or non-existent. For example, the vibration damping material layer may be of smaller length, width, and thickness than the magnetic material layers. This method of minimizing any exposed vibration damping material could enable easier coating of the completed core with a protective coating as described later herein.

Each magnetic layer may optionally be divided into two or more sections. However, the layers would need to be joined in a manner to provide for a core or stator, rotor or transformer prepared therefrom having structural integrity.

The stator and rotor of the present invention each comprise a stator core and rotor core respectively having conductive wire (such as copper or aluminum wire) wound around the poles thereof. The transformer of the present invention comprises a transformer core having conductive wire wound around the outside of the core or around two sides (when the core has an opening therein), for example. One skilled in the art would be able to select the appropriate wire and winding pattern. The wire can be wound quickly and easily when a core is provided having rounded edges which are less likely to cut the wires.

Coatings

The core of the invention may have a protective coating thereon, such as a polyester, epoxy or "E"-coating, etc. The protective coating may provide environmental and end use protection (rust resistance, corrosion resistance, abrasion resistance, outgassing prevention, etc.) and also improve winding of the core with the conductive wire (copper, aluminum, alloys, etc.). The coating may also offer improved structural integrity to the completed stator, rotor, or transformer.

The present invention will be better understood by referring to the following figures.

FIG. 1 illustrates a perspective view of an internally damped stator core 2 of the present invention having alternating magnetic and vibration damping material layers. The upper and lower magnetic layers are identified as 4 and 8 respectively and the vibration damping material layers as 6. The internally positioned magnetic layers are identified as 7. The stator core 2 has twelve poles, each identified as 10 and attached to and extending from ring 5, and a central hole identified as 3. The spaces or cut-outs between the poles 10 are each identified as 9.

Figure 2:
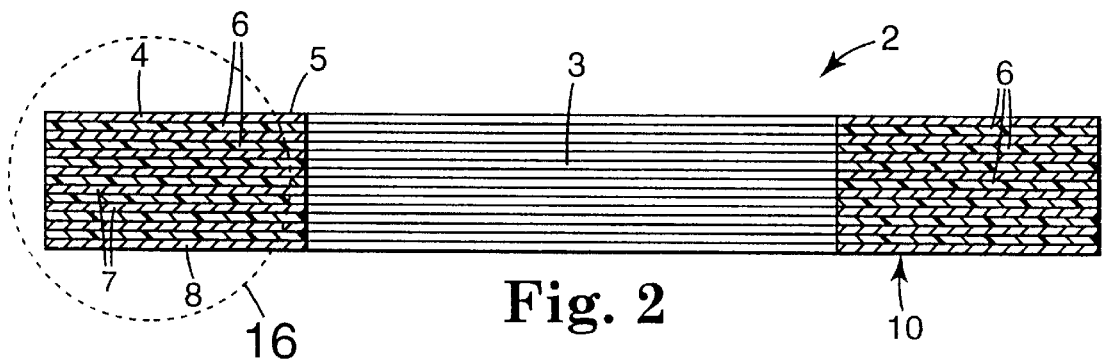
FIG. 2 illustrates a cross-sectional view of the internally damped stator core of FIG. 1 taken along line 2—2.

FIG. 2 illustrates a cross-sectional view of the internally damped stator core 2 of FIG. 1 taken along line 2—2.

Figure 3:
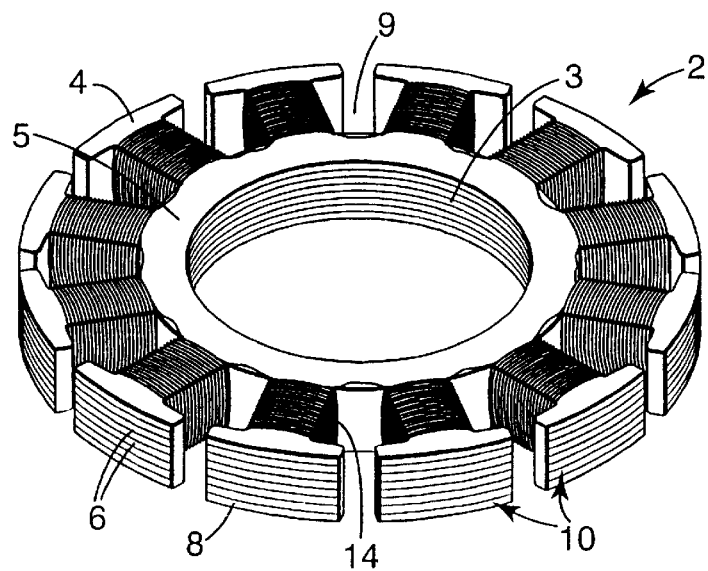
FIG. 3 illustrates a perspective view of a damped stator of the present invention.

FIG. 3 illustrates a perspective view of an internally damped stator of the present invention formed from the internally damped stator core 2 of FIG. 1. The wires wrapped around the poles 10 of the stator core 2 are identified as 14.

Figure 4:
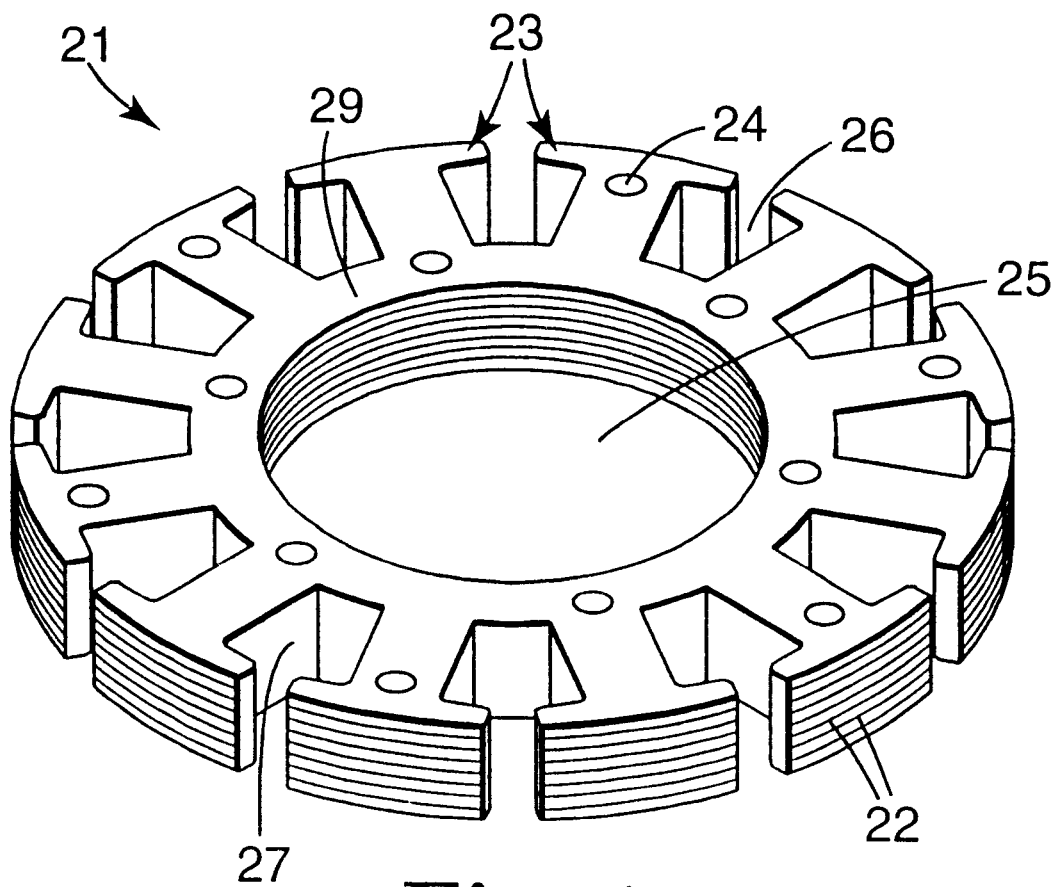
FIG. 4 illustrates a perspective view of a non-damped prior art stator core.

FIG. 4 illustrates a perspective view of a prior art stator core which is not internally damped. The magnetic layers are identified as 22 and are held together by staking. The staking indentations are identified as 24. The stator core 21 has poles 23 and central hole 25. Cut-outs or spaces 26 exist between the poles 23. Poles 23 extend from ring 29.

Figure 5:
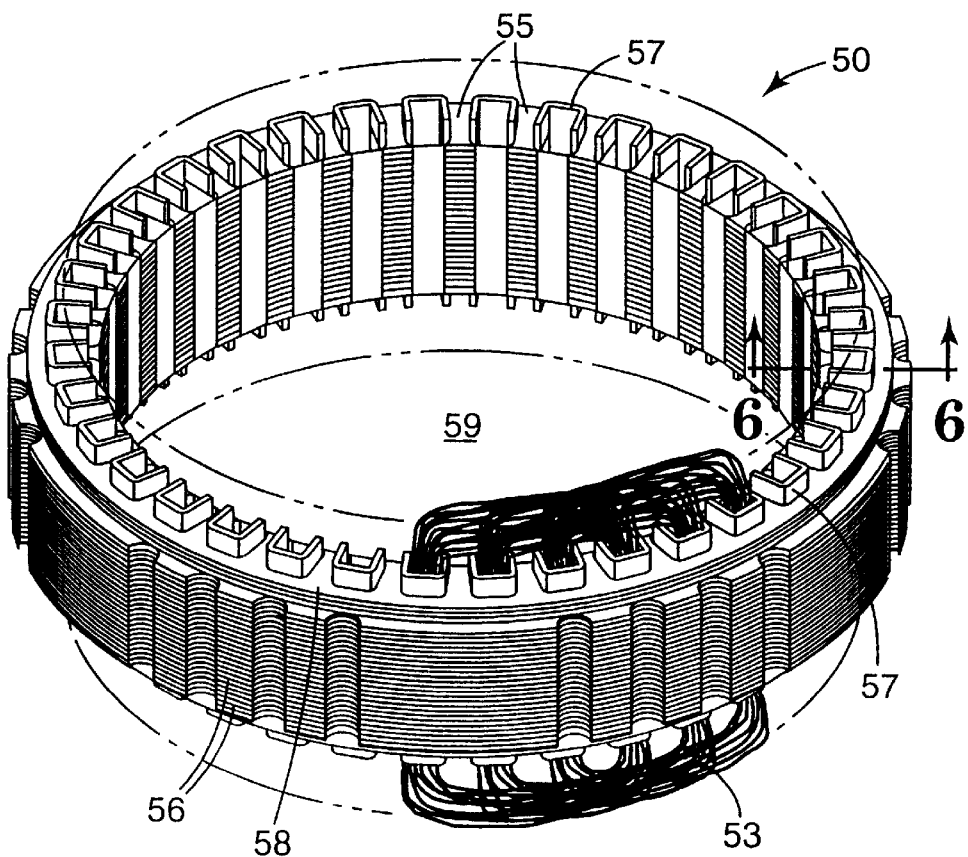
FIG. 5 illustrates a perspective view of a non-damped prior art stator.

FIG. 5 illustrates a perspective view of a prior art stator 50. The magnetic layers 56, 58, and 54 (not visible in FIG. 5) are held together by rivets (not shown). The magnetic layers 54 and 58 are of slightly smaller cross-sectional area than magnetic layers 56. The wires wrapped around the magnetic layers are identified as 53. The thirty-six stator poles are each identified as 55. The stator 50 has a central hole 59. Insulating sheets 57 fit between the poles 55.

Figure 6:
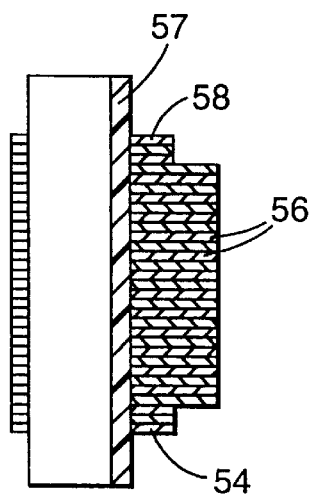
FIG. 6 illustrates a cross-sectional view of the non-damped prior art stator of FIG. 5 taken along line 6—6.

FIG. 6 illustrates a cross-sectional view of the non-damped prior art stator taken along line 6—6.

Figure 7:
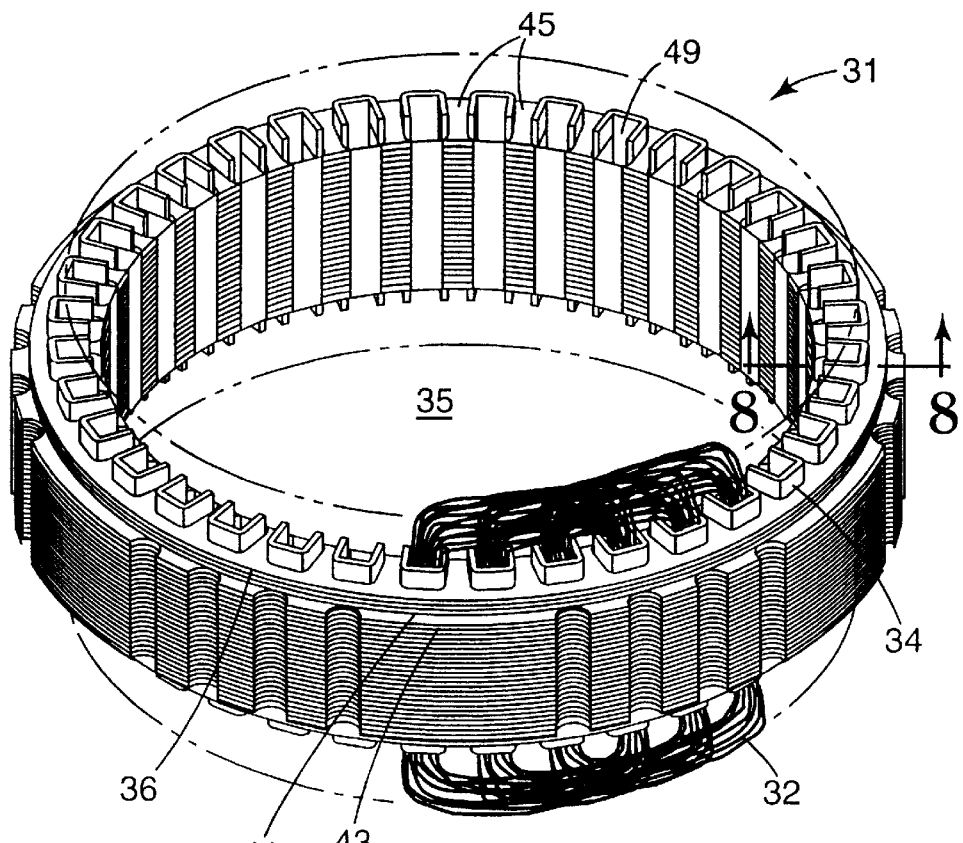
FIG. 7 illustrates a perspective view of an internally damped stator of the present invention.

FIG. 7 illustrates a perspective view of an internally damped stator 31 of the present invention having alternating magnetic and vibration damping material layers. The upper and lower magnetic layers are identified as 36 and 38 (not visible in FIG. 7) respectively, the remaining magnetic layers as 41, and the vibration damping material layers as 43. The stator core has thirty-six poles, each identified as 45. The stator 31 has a central hole 35. Insulating sheets 34 fit between the poles 45. The wires wrapped around the poles 45 are identified as 32.

Figure 8:
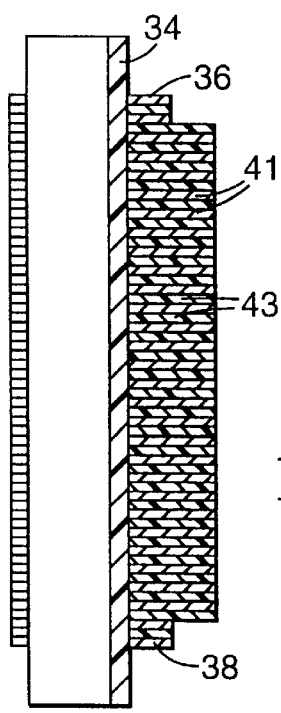
FIG. 8 illustrates a cross-sectional view of the internally damped stator of FIG. 7 taken along line 8—8.

FIG. 8 illustrates a cross-sectional view of the internally damped stator of FIG. 7 taken along line 8—8.

Figure 13:
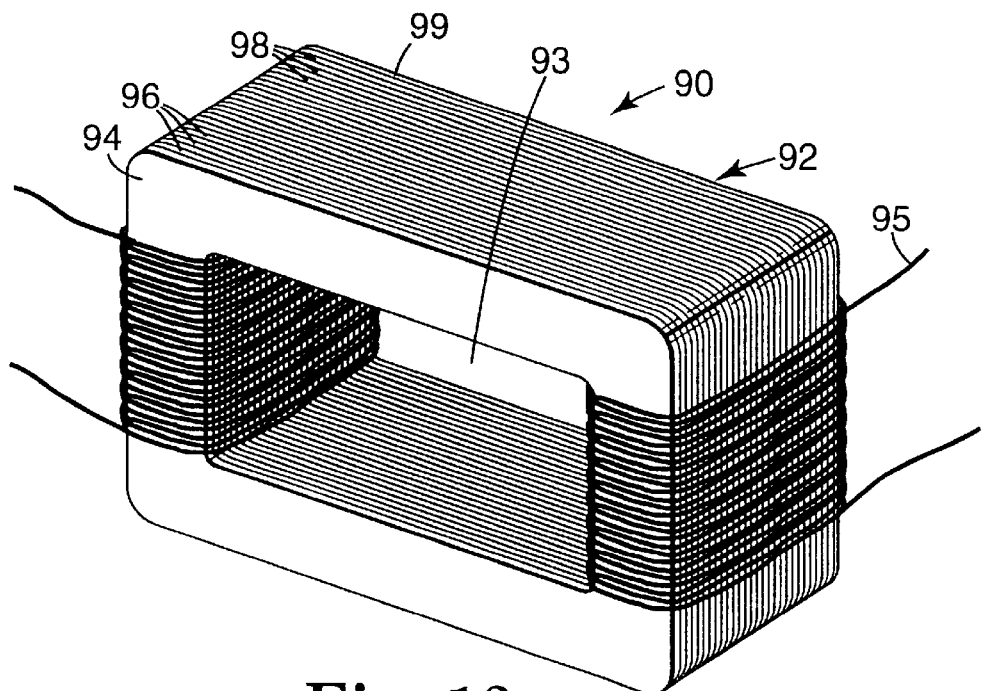
FIG. 13 illustrates a perspective view of an embodiment of a transformer of the invention.

FIG. 13 illustrates a perspective view of an internally damped transformer 90 of the present invention having alternating magnetic and vibration damping material layers. The transformer core is identified as 92. The upper and lower magnetic layers are identified as 94 and 99 respectively and the vibration damping material layers as 96. The internally positioned magnetic layers are identified as 98. The transformer core 92 has a central hole identified as 93. Wires 95 are wrapped around opposite sides of the transformer core 92.

Figure 14:
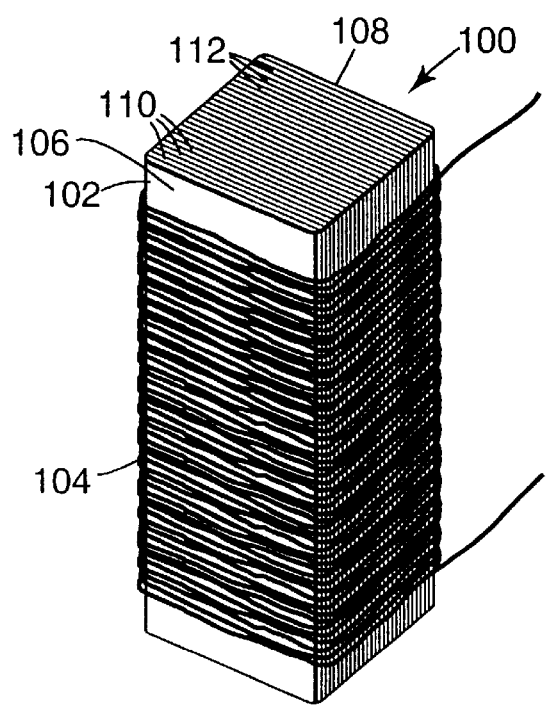
FIG. 14 illustrates a perspective view of another embodiment of a transformer of the invention.

FIG. 14 illustrates a perspective view of an internally damped transformer 100 of the present invention having alternating magnetic and vibration damping material layers. The transformer core is identified as 102. The upper and lower magnetic layers are identified as 106 and 108 respectively and the vibration damping material layers as 110. The internally positioned magnetic layers are identified as 112. Wires 104 are wrapped around the sides of the transformer core 102.

Figure 15:
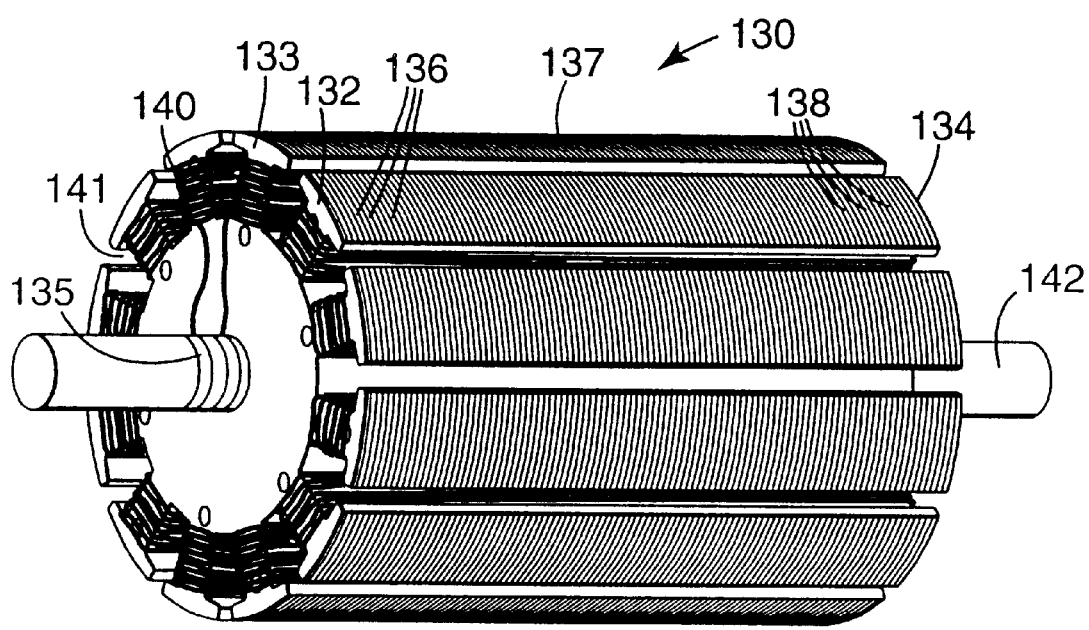
FIG. 15 illustrates a perspective view of a rotor of the present invention.

FIG. 15 illustrates a perspective view of an internally damped rotor 130 of the present invention having alternating magnetic and vibration damping material layers. The rotor core is identified as 137. The upper and lower magnetic layers are identified as 132 and 134 respectively and the vibration damping material layers as 136. The internally positioned magnetic layers are identified as 138. The rotor core 137 has twelve poles each identified as 133. Wires 141 are wrapped around poles 133. The poles 133 extend from ring 135. A rod 142 extends through the ring 135.

Methods of Making

The internally damped stator, rotor, or transformer core of the present invention can be made by a variety of methods.

One method would be to provide individual magnetic layers, having the desired shape (a ring with poles joined to the ring and extending away from the exterior perimeter of the ring, for a stator or rotor, for example, and a rectangular shape with an optional internal cut-out such as a rectangular cut-out for a transformer, for example). For example, one could provide a vibration damping material layer on top of a first magnetic layer, provide a second magnetic layer on top of the vibration damping material layer, provide another vibration damping material layer on top of the second magnetic layer, followed by another magnetic layer, etc. The top and bottom layer of the core would both be magnetic layers. The aforementioned magnetic layers may optionally be sectioned.

Although it would be possible to die cut or otherwise cut separate layers of vibration damping material and magnetic material and stack one layer upon another such process would be costly and slow, and would not lend itself well to automation. Each magnetic layer would preferably need at least one damping layer between it and the next magnetic layer, and the damping layers can be of a polymeric material that is "sticky" or "tacky" at room temperature and thus difficult to work with.

Combining many magnetic layers with a typically sticky, very thin and low modulus vibration damping material (i.e., not stiff or easily handleable) would most likely not provide for a low cost, high volume manufacturing line. In addition, assembly would be slow, potentially subject to contamination in various layers, and require significant assembly tooling and fixtures.

Another method of providing a core of the present invention would be to first provide a laminate of the desired number of magnetic layers and vibration damping material layers and then stamp out or otherwise cut individual cores from the laminate.

The laminate to be cut would comprise two outer magnetic layers and an inner vibration damping material layer. The laminate may optionally further comprise additional vibration damping material layers and/or additional magnetic layers between the two outer magnetic layers. Preferably the core comprises at least 5 layers, more preferably at least 7 layers, and most preferably at least 10 layers total of damping material and magnetic material. The laminate layers can vary in order, but typically have an alternating magnetic layer-vibration damping material layer-magnetic layer- etc." configuration. A disadvantage of this method is that the stamping procedure may result in the formation of an exposed burr on the bottom magnetic layer, especially for the laminates of greater thickness. Furthermore a cutting or stamping procedure which provides the core with rounded edges (which is desirable) is more likely to provide a burr on the bottom magnetic layer of greater magnitude. Such a burr may be difficult to reduce.

This burr can cut into the wire which is to be wrapped around the core. One may optionally be able to sand or otherwise wear down the burr, such as by "spanking" or pounding the burr to decrease its size in a way which does not create a sharp edge, but this can lead to secondary processing steps, added cost, potential delamination of the stator core, etc. In addition, a rounded surface would not be obtained by merely spanking the burr. Alternatively one may provide a covering over the burr in order to minimize this problem, although the burr could potentially cut through the covering and still damage the stator wires.

Another method of preparing a core of the present invention is to prepare at least two separate laminates. Sections of typically identical shape (length and width, but not necessarily thickness) are die cut from each laminate and joined together to form the final core. One laminate would comprise at least two layers (an upper magnetic layer and a lower vibration damping material layer), preferably at least 4 layers (upper magnetic layer/vibration damping material layer/magnetic layer/lower vibration damping material layer) and optionally a release liner on the opposite side of the vibration damping material layer farthest away from the top magnetic layer. Additional magnetic layers and/or vibration damping material layers (typically alternately positioned) may be positioned between the upper magnetic layer and the lower vibration damping material layer. The magnetic material is typically provided in the form of a coil. A section is then die cut from this laminate having the same length, width, and shape as the desired stator, rotor, or transformer article.

A second laminate is prepared comprising at least three layers: an upper magnetic layer, a lower layer of magnetic layer, and an inner layer of vibration damping material. The second laminate may optionally further comprise additional vibration damping material layer(s) and magnetic layer(s) as inner layer(s). A section having the desired shape of the final core is cut from this second laminate.

The bottom most magnetic layer of this section cut from the second laminate would have a burr due to the cutting procedure (such as a die cutting procedure) which could interfere with the wire to be wrapped around the stator, rotor, or transformer if this layer was used as an outer layer of the core. A cut or damaged wire could result in corrosion of the wire, higher resistance in the wire, reduced motor performance, a short to the core, and/or motor failure, etc. However, this bottom layer of the section cut from the second laminate ultimately becomes an interior layer of the final core. This occurs since the liner is removed from the first section cut from the first laminate (if the liner is present) and the exposed vibration damping material layer of the first section is applied to the magnetic layer having the burr which was cut from the second laminate to result in a damped core that has no exposed burr.

In other embodiments more than two laminate sections may be joined to form a core. The burrs of any laminate sections are preferably placed in a manner to make them internal to the final core. For some laminate sections, a burr may be so large that it may be desirable to partially or totally remove the burr by grinding, spanking (i.e. pounding to at least partially flatten), etching or other means to provide a sufficiently flat surface such that the laminate sections can more easily be joined. A vibration damping material layer of a thicker construction would more readily bond to a magnetic layer having a large burr.

Cores of the invention can also be made from combinations of laminate sections that differ from those previously described. Cores may be made for example, from laminate sections which have no outer layer(s) of vibration damping material to aid in joining. For example, one may desire to join three laminate sections similar to those cut from the second laminate as described above. None of the three laminate sections have an outer layer of vibration damping material. As another example one may desire to join three laminate sections wherein one laminate section is similar to that cut from laminate section one having an outer vibration damping material layer and two laminate sections are similar to those cut from laminate section two, wherein neither of the two have an outer vibration damping material layer.

Epoxies or other adhesives may be used to aid in joining such laminate sections together. Mechanical means such as stacking, swaging, coining, embossing, mechanical fasteners such as screws, etc. may also be used to join such laminate sections together.

The laminate sections when joined together may optionally have pressure applied thereto. The pressure may be sufficient to partially or completely flatten the burr(s), so that no burr is present of sufficient height or dimensions on an outer magnetic layer of a laminate section that would prevent the laminate sections from being joined to form a core. This can be accomplished by using various tonnage presses. This method should be done in a manner that limits the bulging of any burr away from the plane of the side of the core to minimize any potential side burr creation such as bulges which could cause damage to wires when wound around the stator core. Preferably no bulges are present. However, any bulges present are preferably less than about 0.030 inch (0.762 mm), more preferably less than about 0.020 inch (0.508 mm), even more preferably less than about 0.010 inch (0.254 mm) and most preferably less than about 0.002 inch (0.0508 mm).

The total number of magnetic layers plus vibration damping material layers in a laminate section can vary. Typically the total number of magnetic layers plus vibration damping material layers in a section is at least about 2, 3, 4, 5, 6, 7, 8, 9, 10, 11, 12, 13, 14, 15, 16, 17, 18, 19, 20, etc. The total number of magnetic layers plus vibration damping material layers in each laminate section from which a core is made is typically at least about 3 layers, preferably at least about 5 layers, and most preferably at least about 10 layers.

The laminate section bottom layer (if a magnetic layer) will have a burr (as a result of the stamping process), preferably less than about 30% of the bottom layer thickness, more preferably less than about 10%, most preferably less than about 2%. This burr can be reduced by "spanking" or by another mechanical process (such as grinding), but when done the burr should then be less than 2% of the bottom layer thickness (preferably nonexistent) and also should not extend more than 0.005 inch (0.127 mm) past the edge of the laminate section creating a sharp edge or side burr.

Each laminate is typically die cut in a die set-up that provides a laminate section with a top magnetic layer having rounded edges with no exposed burr (extending vertically or horizontally, for example) and a bottom magnetic layer with an exposed burr (when the bottom layer is a magnetic layer). Thus, if the top layer is a magnetic layer and the bottom layer a vibration damping material layer the top layer would have rounded edges. An internally positioned magnetic layer may optionally have a burr, but the burr would not be exposed due to the positioning of the magnetic layer.

The core can thus be made in a manner in which the rounded edges are provided on at least the top and bottom magnetic layers on the final core. These rounded edges help prevent the wire(s) wound around the core from being cut or slit through their protective coating leading to an electrical short, high resistance, or degrading motor performance. The protective layer is typically a polymeric coating, such as polyethylene, polyester, polypropylene, etc.

The laminate may, for example, be fed directly into the die for die cutting out laminate sections or may be wound into a coil for die cutting at a future time. The laminate coils may also need to be "heat" aged in an oven or environmentally controlled chamber to increase adhesion of the vibration damping material to the magnetic layer(s) prior to die cutting. Some magnetic materials have a protective coating applied to them to protect the magnetic materials from corrosion or other damage. This coating may limit adhesion of some types of vibration damping materials and thus may require additional processing to achieve good bonding between the vibration damping material and the magnetic material used. Such a coating may also necessitate that an adhesive be used between a vibration damping material layer and a magnetic layer to achieve the desired bond strength so that the laminate layers can be flattened and/or die cut without delamination problems or wound into coils for later use.

The laminate coils can optionally be heat aged for 1 or more hours at about 150 to about 250° F. (about 65 to about 121° C.) to increase the bonding of the magnetic layers to the vibration damping material layers. For direct feed applications into a die cutting tool, the laminate can optionally be preheated (at about 65 to about 121° C.) just after lamination or prior to the initial contact of the vibration damping material to the magnetic layer(s) to increase adhesion between laminate layers. Quartz high intensity heat lamps, hot air or dry nitrogen, or heated platens/rollers could be used to raise the temperature of the magnetic layers, vibration damping material or both before lamination. Pressure may be applied during lamination of the damping material to the magnetic layers, typically about 5–50 psi ($3.45 \times 10^4$ to $3.45 \times 10^5$ Pascals).

The unwound coil or laminate can be optionally flattened with a 3 to 15 roll type roller flattening system (or straightener) or fed directly into a high tonnage press (greater than about 2 tons, preferably greater than about 20 tons, more preferably greater than about 50 tons) and a multi-cavity progressive tool. Compound stage tooling could optionally be used if the laminate was of a sufficient initial size to provide coupons. Staging could occur in a single or multiple presses of different die configurations.

Preferably each laminate section used to make a core has rounded edges on its top magnetic layer. Preferably each core has rounded edges on its top and bottom magnetic layers. Most preferably the core's edges are rounded.

Figure 16:
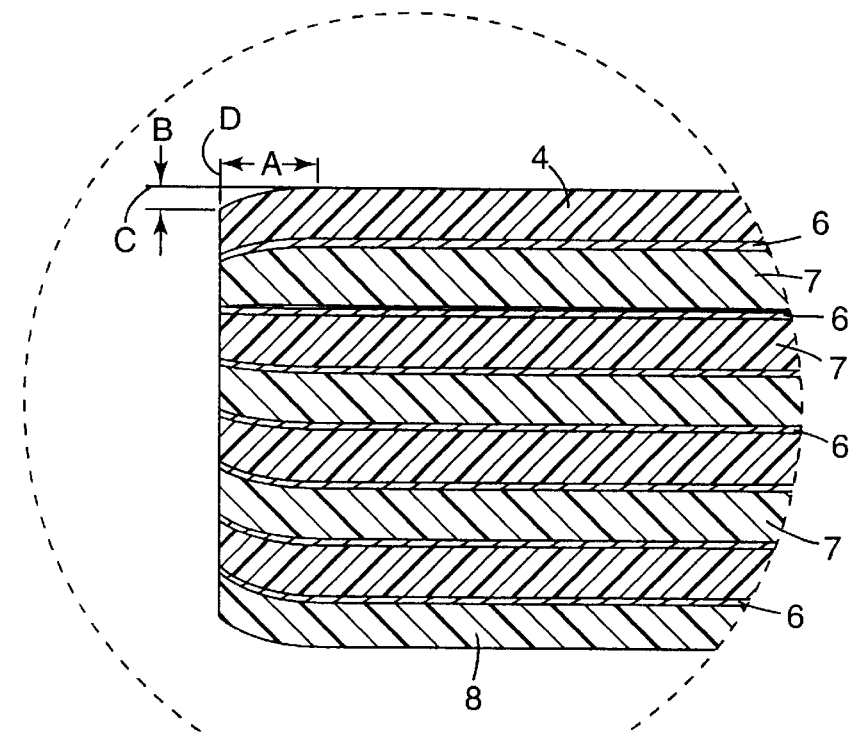
FIG. 16 illustrates a partial enlarged view of a stator core cross-section of FIG. 2.

FIG. 16 is an enlarged view of a portion of FIG. 2. FIG. 16 has a shape which results from preparing the core according to Example 3 wherein four laminate sections are used to make the core. The top and bottom magnetic layers have rounded edges. The amount by which an edge is rounded can be measured as follows.

The rounded edge to be measured can be fit as closely as possible within an imaginary right angle formed by the perpendicular intersection of two straight lines which are identified as line C and line D. Line C substantially overlies the top of the upper magnetic layer except near the edge where the top of the magnetic surface becomes rounded in a downward direction (towards the center of the core). The vertical distance between the edge of the magnetic layer being measured and the top of the magnetic layer (actually up to horizontal line C) is identified as B. (B may also be referred to as an edge roll.)

Line D substantially overlies the side of the core. The horizontal distance between the point of the top of the top magnetic layer where it begins to curve downward and line D is identified as A. (A may also be referred to as an intrusion.)

With respect to all the aforementioned edges, preferably A is at least about 0.003 inch (0.07 mm), more preferably at least about 0.010 inch (0.3 mm), even more preferably at least about 0.020 inch (0.5 mm), and most preferably at least about 0.040 inch (1 mm). With respect to all of the aforementioned edges, preferably each edge is independently selected to have B of at least about 0.003 inch (0.07 mm), more preferably at least about 0.010 inch (0.3 mm), even more preferably at least about 0.020 inch (0.5 mm), and most preferably at least about 0.040 inch (1 mm). The greater A and B the rounder the edge.

Preferably the internally damped cores of the invention are designed and produced such that they do not experience delamination. However, any delamination occurring between core layers should not exceed 20 percent of the surface area of any two adjoining layers which would be in contact except for the delamination, preferably less than 10%, more preferably less than 5% and most preferably less than 1%.

Preferably the first laminate section is paired with at least one other laminate section and mated so that the rounded edges are exposed and any exposed burr of the stamped laminate section is inward to the final core.

The vibration damping material layer(s) which may be used to join laminate sections may allow for a broad range of burr heights on a magnetic layer(s) of laminate section(s) which are destined to be inner layer(s) of the core, as the damping material may be of a sufficient thickness to join laminate sections with burrs internal to the core together without removing or reducing the burr produced by cutting out the laminate section. This is a significant advantage over current non-damped stators as each magnetic layer in a current non-damped stator must be relatively burr free or the magnetic layers will not easily fit together, thus leaving potentially significant gaps between magnetic layers. Thus in conventional non-damped stators each magnetic layer needs to be deburred and inspected prior to assembly to avoid gaps in the finished stator core. Stator cores having gaps can lead to excessive noise due to vibrations.

Laminate sections having burrs which are joined together via vibration damping material such that the burrs are on the inside of the core should preferably use a vibration damping material layer of sufficient thickness to allow good bonding with no gaps between laminate sections. Laminate sections assembled with the same burr direction may be able to use a thinner vibration damping material layer(s) to join such laminate sections of the core as the sections will more readily mate or fit together due to the common burr direction of the laminate sections.

The laminate sections should preferably be joined in such a manner that the sections should mate together in a manner to minimize (and preferably completely avoid) any mismatching or misalignment (i.e., such that they are aligned or matched), as mismatching or misalignment could create an exposed ledge(s), projection(s) or step(s). It is preferred that any step, ledge or projection due to mismatching laminate sections or the laminate layers themselves, be less than 0.030 inch (0.762 mm), more preferably less than 0.010 inch (0.254 mm) and most preferably less than 0.003 inch (0.0762 mm). Steps, ledges or projections may, however, be present due to the intentional use of magnetic layers of different size (length and width). This would be different than steps, ledges, or protrusions caused by mismatching.

Thus, according to the preferred method of the invention, the core of the invention is made from at least two laminate sections wherein the sections are preferably positioned with the rounded edges of the laminate sections as the final outer layers of the finished core, thus providing an internally damped core with no exposed burrs. The core can optionally be made from more than two laminate sections. In such a case, the core is preferably made such that the two outer magnetic layers of the core have rounded edges.

Thus, laminate sections can be joined, for example, by virtue of the vibration damping material layers that are exposed on one or more laminate sections. It is also possible to employ other methods (such as adhesives, staking, embossing, coining, outer coatings, etc.) to join various laminate sections to each other. Although these methods of joining are less convenient, excellent damping results would still be expected.

This method of preparing separate laminate sections and subsequently joining them provides for a high quality manufacturing system, the optional elimination of mechanical attachment methods (such as staking) to hold the layers of the core together, excellent dimensional control, and superior surface finish.

This preferred method is also advantageous in that it is cost effective. The core layers need not be stamped or die cut as single layers, thus reducing tool wear, cleaning steps, inspection and assembly steps. Because laminate sections are stamped from a multi-layer laminate there is less stamping required to make a final internally damped stator, rotor, or transformer which saves cost and time, reduces machine wear, and increases speed of assembly. Deburring of each magnetic layer is also not needed.

The preferred method of the invention is also advantageous in that it allows the use of any vibration damping material (i.e. tacky, rigid, soft, etc.) as the damping material is prelaminated with magnetic layers and then die cut. Individual vibration damping material layers are not die cut out in a separate operation and joined to individually die cut magnetic layers. This is a particularly key factor for small stators or rotors with small poles. Positioning an individual small featured die cut damping material layer on a magnetic layer can be very difficult, time consuming, costly, low yield, and not workable for a high volume application where there could be the need for millions of internally damped stators, rotors, or transformers to be produced within a week.

Furthermore, the preferred method of the invention allows for flexibility in stator, rotor, or transformer design. For example, one may conveniently provide more than one vibration damping material layer between any two magnetic layers using the preferred method and also alternate vibration damping material types in any layering scheme desired. It is also possible to use different magnetic material layers to modify the stator, rotor or transformer performance.

The use of vibration damping material having adhesive properties or an adhesive in addition to vibration damping material can eliminate the need for staking, embossing, or coining of magnetic layers, etc.

The use of vibration damping material in the stator, rotor, or transformer of the invention, in addition to providing vibration damping properties, may also provide improved thermal and/or magnetic and/or electrical properties of the stator, rotor, or transformer for an end use motor application.

Uses of the Stators, Rotors and Transformers of the Invention

The stator of the invention can be used in a variety of electric motors and magnetic motors including but not limited to those present in the following: vehicles such as automobiles, for example; power generating equipment; disk drives; etc.

The rotor of the invention can be used in a variety of electric motors and magnetic motors including but not limited to those present in the following: vehicles such as automobiles, for example; power generating equipment; disk drives; etc.

The transformer of the invention can be used in a variety of power supplies including but not limited to those present in the following: computers, stereo equipment, power stations, etc.

Examples

The invention has been described with reference to various specific and preferred embodiments and will be further described by reference to the following detailed examples. It is understood, however, that there are many extensions, variations, and modifications on the basic theme of the present invention beyond that shown in the examples and detailed description, which are within the spirit and scope of the present invention. All parts, percentages, ratios, etc., in the Specification and the Examples are by weight unless indicated otherwise.

Abbreviations

ISD 112:

3M ISD 112, acrylic damping polymer available from Minnesota Mining and Manufacturing Company, St. Paul, Minn. The damping material has a loss factor greater than 0.5 for a broad frequency range (+/−1000 Hz) at the desired test temperature (20° C./72° F.).

ISD 110:

3M ISD 110, acrylic damping polymer available from Minnesota Mining and Manufacturing Company, St. Paul, Minn. The damping material has a loss factor greater than 0.5 for a broad frequency range (+/−1000 Hz) at the desired test temperature (50° C./122° F.).

ISD 140:

3M ISD 140, acrylic damping polymer available from Minnesota Mining and Manufacturing Company, St. Paul, Minn. The damping material has a loss factor greater than 0.5 for a broad frequency range (+/−1000 Hz) at the desired test temperature (50° C./122° F.).

Comparative Example 1

A GM CS 100 amp alternator was placed on a Crumbliss Model 2450-1850 Alternator Generator and Starter Tester. A microphone was positioned 1 inch (2.54 cm) from and perpendicular to a location on the outside circumference of the alternator. The microphone was connected to a Bruel and Kjaer Type 2120 Frequency Analyzer. The Bruel and Kjaer Analyzer was connected to the first channel input of a Tektronix 2630 Fourier Analyzer. An accelerometer (Endevco Model 22) was adhered to the alternator on the outside circumference surface. It was connected to the second input channel of the Fourier Analyzer. The alternator was spun and a load of 60 amps was placed on it. The resulting sound and surface acceleration were measured as a function of time. A subsequent fast fourier transform on the data gave the results as a function of frequency.

The General Motors GM CS 100 amp alternator was then disassembled in order to remove the stator. The stator had 31 ferrous layers each about 0.032 inches (0.0081 mm) thick. The stator was about 2.6 cm in height and about 13 cm in diameter. Several of the uppermost and lowermost magnetic layers were slightly smaller in area than the middle layers. The stator had a central hole 9.7 cm in diameter. The stator had thirty-six poles with wire wrapped therearound. The stator had the same configuration as that shown in FIGS. 5 and 6.

Figure 9:
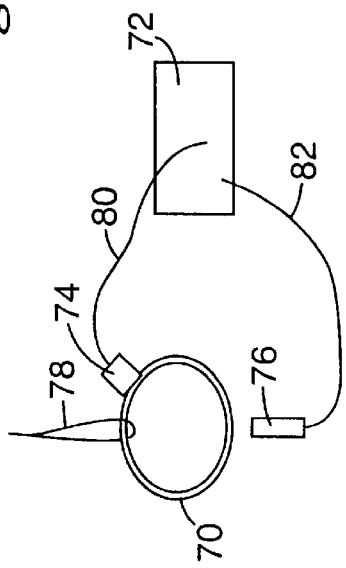
FIG. 9 illustrates a schematic of the set up used to measure accelerations of the stators of Comparative Example 1 and Example 2.

The stator was suspended in a freely supported condition. An electromagnetic transducer (Electro 3030 HTB A) was used to excite the stator at a point at the bottom and on the outside of the stator. The resulting acceleration was measured with an accelerometer (Endevco Model 22) at a point on the outside of the stator which was 135° from the point of excitation. The setup is shown in FIG. 9 wherein the stator is identified as 70, the FFT Analyzer as 72, the accelerometer as 74, the electromagnetic transducer as 76, the large suspending rubber band 78, the wire connecting the accelerometer and FFT analyzer as 80, and the wire connecting the electromagnetic transducer and FFT analyzer as 82.

Figure 10:
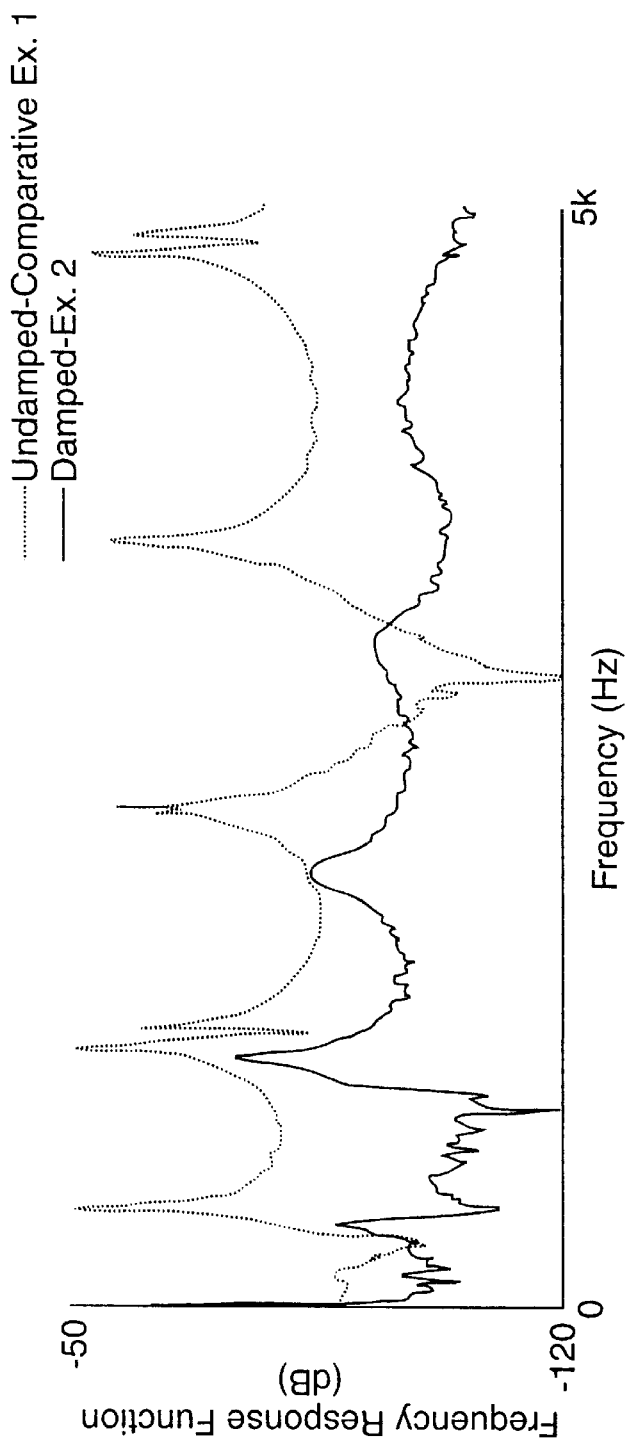
FIG. 10 illustrates a graph of the Frequency Response Function versus frequency for the stators of Example 1 and Comparative Example 2.

The input force and resulting acceleration were measured as a function of time. This was transformed to frequency data by a Tektronix 2630 Fourier Analyzer to produce a frequency response function. The system loss factor for three different modes were calculated by using the half power bandwidth method. The frequency response function versus frequency for the undamped stator is shown in FIG. 10.

Example 2

The wires were removed from the stator of Comparative Example 1. The core retaining rivets were removed, allowing the 31 ferrous layers, each 0.032 inch thick) to be disassembled. A 0.001 inch (0.00254 cm) ISD 110 vibration damping material layer was then added between each ferrous layer (each cut to the shape of the ferrous layer, with one ferrous layer omitted to maintain the same overall thickness of the stator. This core, which did not require rivets due to the adhesive qualities of the ISD-110 layers, was then rewound with wire. The damped stator assembly was tested in the same way as the undamped stator of Comparative Example 1. The frequency response function versus frequency for the internally damped stator is shown in FIG. 10.

The frequency response function, which is the ratio of the response acceleration to the input force, is shown as a function of frequency. A peak in the frequency response function occurs at resonance. FIG. 10 shows that the addition of damping material to the stator lowers the peak value at resonance which means that the surface acceleration and displacement are reduced. The peaks have all been lowered by from 20 to 40 dB.

The loss factors for three of the modes are shown in the following table.

The data in the table demonstrates the effect of the damping material on the inherent damping of the stator assembly. The loss factor and the resonant frequency are listed for the 2nd, 3rd and 4th modes of vibration of the stator. The loss factor, which is the ratio of the amount of energy dissipated to the amount of energy stored and returned to the system, increases with the addition of damping material. This will lead to a decrease in amplitude of vibrational acceleration, velocity, and displacement.

| Mode | Comparative Example 1 Frequency (Hz) | Comparative Example 1 Loss Factor | Example 2 Frequency (Hz) | Example 2 Loss Factor |
| --- | --- | --- | --- | --- |
| 2 | 1163 | 0.0017 | 1125 | 0.044 |
| 3 | 2250 | 0.0044 | 1962 | 0.070 |
| 4 | 3475 | 0.0072 | 2987 | 0.100 |

Figure 12:
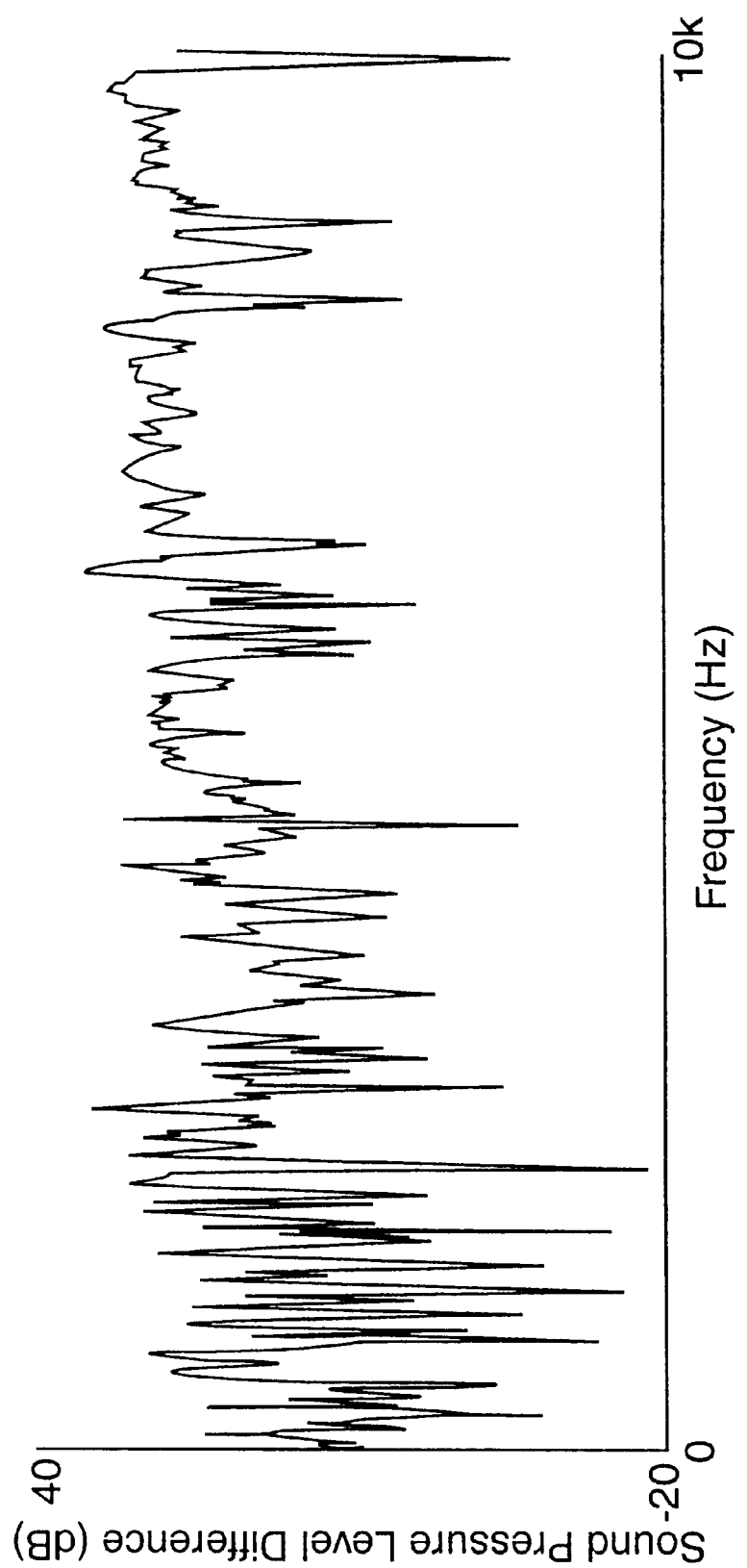
FIG. 12 illustrates a graph of the sound pressure level difference versus frequency between an alternator incorporating the stator of Comparative Example 1 and an alternator incorporating the damped stator of Example 2.

After testing the damped stator, the alternator of Comparative Example 1 was reassembled except for the use of the damped stator in place of the undamped stator. The reassembled alternator was tested the same way as the undamped alternator using the Crumbliss Tester and measuring the sound and surface acceleration. FIG. 12 shows the difference between the sound pressure level of the alternator with an undamped stator and the sound pressure level of the alternator with a damped stator.

Figure 11:
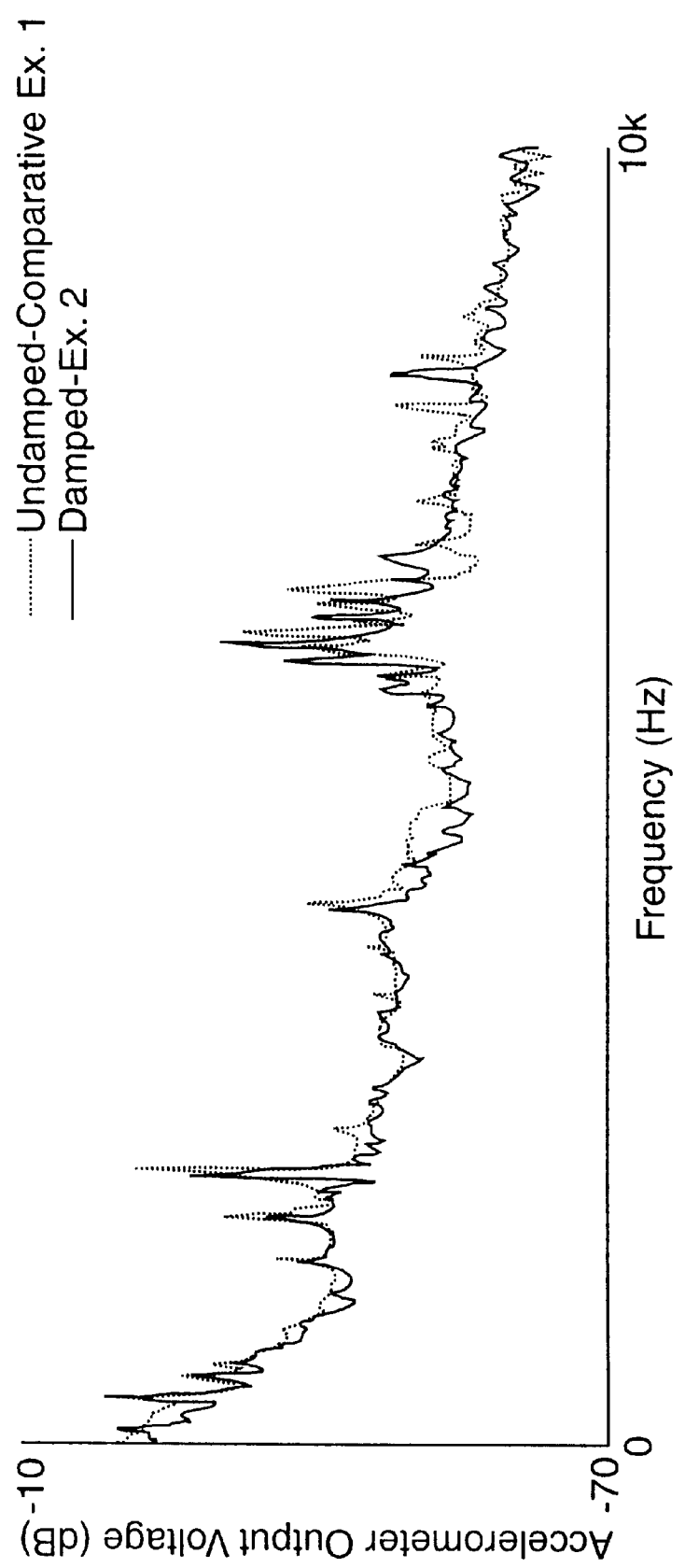
FIG. 11 illustrates a graph of the accelerometer output voltage versus frequency for an alternator incorporating the stator of Comparative Example 1 and an alternator incorporating the damped stator of Example 2.

The difference values are mostly positive and are as great as 35 dB. This indicates that the alternator with the damped stator has a decreased sound pressure level resulting from operation than that of the alternator with an undamped stator. FIG. 11 shows the acceleration on the surface of the alternator case due to operation.

FIG. 11 shows that the alternator with the damped stator has reduced acceleration on the case due to vibration than does the alternator with an undamped stator.

Example 3

Stator Core of the Invention

The method of Example 3 included lamination, die cutting and assembly steps.

Lamination

Strips 24 inches (61 cm) in length were cut from a coil of 1.25 inches (31.75 cm) wide and 0.35 cm thick 35H270 non-oriented electrical steel available from Nippon Steel Corporation (NSC). The steel had a special surface insulation coating bonded to both sides which was applied by the supplier. The strips were made into laminates of two types—Type 1 and Type 2. A Type 1 laminate comprised: 0.0135 inch (0.34 mm) thick steel/0.001 inch (0.025 mm) thick ISD 140 vibration damping material/0.0135 inch (0.34 mm) thick steel. A Type 2 laminate comprised: 0.0135 inch (0.34 mm) thick steel/0.001 inch (0.025 mm) thick ISD-140 vibration damping material/0.0135 inch (0.34 mm) thick steel/0.001 inch (0.025 mm) ISD 112 vibration damping material with a 0.004 inch (0.102 mm) brown paper release liner. All Type 1 laminates were made using a Vacuum Pad Applicator (VPA) with a temperature of 225° F. (107° C.) for 20 minutes. Each Type 2 laminate was similar to the Type 1 laminate except for the addition of the 0.001 inch (0.025 mm) ISD 112 vibration damping material and the release liner. The purpose of this ISD 112 layer was to provide damping and also bonding of the individual laminate sections in the later described assembly process. Because the surface insulation that was bonded to the steel surface was very smooth and of a low surface energy that could limit bond strength to it, the bonding process was important to assure that no delamination occurred either in the subsequently described die cutting or assembly of the laminate sections.

Die Cutting

Die cutting of the individual laminate sections was done using a compound die in a 25 ton press. A heat-treated lower backup plate was used to aid in keeping the laminates flat and provide support for the individual poles of the stator sections. The individual strips of Type 1 or Type 2 laminates were fed into the press and die cut to form laminate sections. One laminate section was cut from Type 1 laminate. Three laminate sections were cut from Type 2 laminates. The individual die cut laminate sections were then set aside for assembly into a complete stator.

Each die cut laminate section was 1.10 inches (28 mm) in diameter and had 12 poles. Each pole was 10 mm in length and 2.7 cm in width at its thinnest part. Each die cut laminate section had a central hole 14.01 mm in diameter.

Assembly

A stator core having eight layers of steel was made from the individual die cut laminate sections. The stator had the same configuration as that of FIGS. 1, 2, and 16. An assembly fixture was used to aid in assembling the die cut laminate sections into the completed stator core.

The assembly fixture comprised a center shaft with an outer diameter matching that of the inner diameter of the die cut Type 1 and Type 2 laminate sections (0.551 inch (14.01 mm)) and four equally spaced pins that fit into the space between individual laminate sections. The center shaft provided a common center for assembling all the individual die cut laminate sections and the four pins assured that the poles of the individual die cut laminate sections lied in the same plane.

A completed stator was made by seating a Type 1 laminate section, edge roll (burr) up over the center post onto the assembly fixture. The paper liner was removed from three of the Type 2 laminate sections and each one was placed over the center post with the exposed vibration damping material and edge roll down making a total of four laminate sections to make the eight steel layer stator.

After verification that the individual layer cutouts and poles were aligned the layers were bonded under pressure from a press-to form the completed stator. A good mating and bonding surface was provided by the edge roll down on the Type 2 laminate sections while the edge roll up on the Type 1 laminate section was done to provide a smooth burr free winding surface. The bonding pressure was sufficient to make the required bond between the Type 1 and Type 2 laminate sections.

Other advantages of this assembly method include the prevention of squeeze out of the vibration damping material onto the wire winding surfaces and the absence of any of the die cutting burrs, that could cut or break the wire windings, from being exposed to the wires.

The same process described above could optionally be modified to produce a stator core from only two laminate sections. This would be accomplished by making the sections of Type 1 and Type 2 with additional layers, or by just increasing the layers in the Type 1 as needed to obtain the desired total number of magnetic and damping material layers. It is preferred to use only two laminate sections to form a stator core as this minimizes the die cutting steps and assembly process steps.

Figure 17:
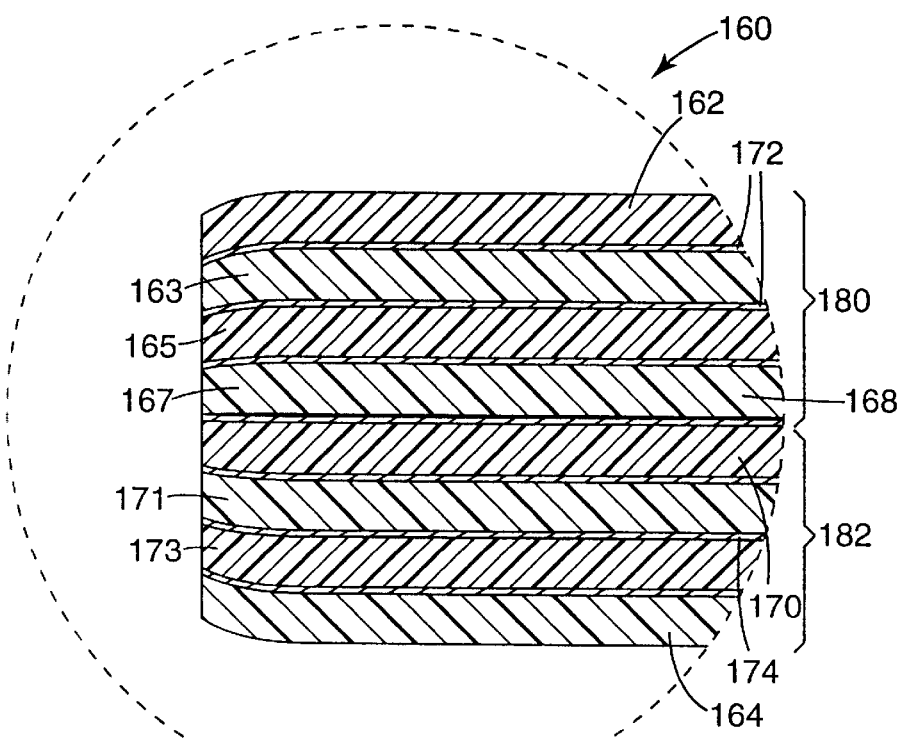
FIG. 17 illustrates partial enlarged view of another embodiment of stator core cross-section of FIG. 2.

Such a stator core may have a configuration similar to that shown in FIG. 17 showing an enlarged edge 160 wherein the core is formed from laminate sections 180 and 182, wherein 162, 163, 165, 170, 171, 173 and 164 are magnetic layers and 172 and 174 are vibration damping material layers.

The foregoing detailed description and example have been given for clarity of understanding only. No unnecessary limitations are to be understood therefrom. The invention is not limited to the exact details shown and described, for variations obvious to one skilled in the art will be included within the invention defined by the claims.

What is claimed is:

1. An internally damped core having at least one inner layer of vibration damping material comprising a viscoelastic material contained therein, wherein the viscoelastic material has a loss factor of at least about 0.1 at a temperature of about 20° C. and a frequency falling within a range of about 1–10,000 Hz, and wherein the core is selected from the group consisting of stator, rotor and transformer cores.

2. An internally damped transformer comprising the core of claim 1, wherein the core is a transformer core, and wire wrapped around the core.

3. The core of claim 1 wherein the vibration damping material further comprises a thermally conductive additive.

4. The core of claim 1 wherein the vibration damping material further comprises a magnetic additive.

5. An internally damped core, wherein the internally damped core comprises a laminate comprising:

(a) two outer magnetic layers;
   (b) an inner layer of vibration damping material comprising a viscoelastic material positioned between the two outer magnetic layers, wherein the viscoelastic material has a loss factor of at least about 0.1 at a temperature of about 20° C. and a frequency falling within a range of about 1–10,000 Hz;

wherein the core is selected from the group consisting of stator, rotor and transformer cores.

6. The core claim 5 wherein the magnetic layers are non-oriented.

7. The core of claim 5 wherein the core has edges and wherein the edges are rounded.

8. An internally damped core, wherein the internally damped core comprises a laminate comprising:

(a) two outer magnetic layers;
   (b) at least two inner vibration damping material layers comprising a viscoelastic material positioned between the two outer magnetic layers, wherein the viscoelastic material has a loss factor of at least about 0.1 at a temperature of about 20° C. and a frequency falling within a range of about 1–10,000 Hz;
   (c) at least one magnetic layer positioned interior to the outer magnetic layers;

wherein the core is selected from the group consisting of stator, rotor, and transformer cores.

9. The internally damped core of claim 8 wherein each vibration damping material layer is positioned between two magnetic layers.

10. The core of claim 8 wherein each magnetic layer comprises a ring having poles extending therefrom.

11. The core of claim 10 wherein each ring has at least 4 poles extending therefrom.

12. The core of claim 10 wherein each ring has at least 8 poles extending therefrom.

13. An internally damped stator comprising the core of claim 10, wherein the core is a stator core, and wire wrapped around the poles of the core.

14. An alternator having the stator of claim 13 installed therein.

15. A motor having the stator of claim 13 installed therein.

16. An internally damped rotor comprising the core of claim 10, wherein the core is a rotor core, and wire wrapped around the core.

17. A motor having the rotor of claim 16 installed therein.

18. The core of claim 8, which comprises at least 8 magnetic layers and at least 7 vibration damping material layers.

19. The core of claim 8 which comprises at least 20 magnetic layers and at least 19 vibration damping material layers.

* * * * *